(12) United States Patent
Paulucci et al.

(10) Patent No.: US 11,120,487 B2
(45) Date of Patent: Sep. 14, 2021

(54) METHOD AND SYSTEM FOR RIDE SHARES INVOLVING HIERARCHICAL DRIVER REFERRALS

(71) Applicant: YUR Drivers Network, Inc., Rochelle Park, NJ (US)

(72) Inventors: Louis Frank Paulucci, Carlstadt, NJ (US); Julio Antonio Colon, Carlstadt, NJ (US)

(73) Assignee: YUR DRIVERS NETWORK, INC., Rochelle Park, NJ (US)

( * ) Notice: Subject to any disclaimer, the term of this patent is extended or adjusted under 35 U.S.C. 154(b) by 6 days.

(21) Appl. No.: 16/426,970

(22) Filed: May 30, 2019

(65) Prior Publication Data

US 2019/0295142 A1 Sep. 26, 2019

Related U.S. Application Data

(63) Continuation of application No. 14/938,129, filed on Nov. 11, 2015, now abandoned.
(Continued)

(51) Int. Cl.
*G06Q 30/06* (2012.01)
*G01C 21/34* (2006.01)
(Continued)

(52) U.S. Cl.
CPC ..... *G06Q 30/0609* (2013.01); *G01C 21/3438* (2013.01); *G01C 21/3697* (2013.01);
(Continued)

(58) Field of Classification Search
CPC ............... G06Q 30/0609; G06Q 50/32; G01C 21/3438; G01C 21/3697; G07B 15/02; G07C 2209/02
(Continued)

(56) References Cited

U.S. PATENT DOCUMENTS

| | | |
|---|---|---|
| 5,694,594 A | 12/1997 | Chang |
| 2002/0174067 A1* | 11/2002 | Hoffman ............... G06F 21/554 705/39 |

(Continued)

OTHER PUBLICATIONS thejournal.ei; "New App Let's You Verify Your Taxi Driver"; Feb. 18, 2013 (Year: 2013).*

*Primary Examiner* — George Chen
*Assistant Examiner* — Dione N. Simpson
(74) *Attorney, Agent, or Firm* — Perkins Coie LLP

(57) ABSTRACT

Systems and methods according to which a mobile application is running on a driver's mobile device for authenticating ride share drivers. When a driver initially registers with a rideshare service, the driver is prompted to provide biometric information via a mobile app running on the driver's mobile device. The biometric information is then stored in a database with a ride share management server in a file associated with the driver's account. Subsequently, when the driver expresses an offer to provide a ride share trip, the server performs an authentication check based on the pre-stored biometric information. Furthermore, the system discloses herein facilitates increased rideshare revenue generation by creating referral chains for a driver when a previously-registered driver, or an affiliate of the rideshare service refers a proposed new driver to the rideshare service and the proposed new driver then registers with the rideshare service.

16 Claims, 22 Drawing Sheets

Related U.S. Application Data

(60) Provisional application No. 62/124,196, filed on Dec. 11, 2014.

(51) Int. Cl.
*G01C 21/36* (2006.01)
*G07B 15/02* (2011.01)
*G06Q 50/32* (2012.01)

(52) U.S. Cl.
CPC ............ *G06Q 50/32* (2013.01); *G07B 15/02* (2013.01); *G07C 2209/02* (2013.01)

(58) Field of Classification Search
USPC .......................................................... 705/13
See application file for complete search history.

(56) References Cited

U.S. PATENT DOCUMENTS

| | | | |
|---|---|---|---|
| 2008/0270019 A1* | 10/2008 | Anderson | G06Q 10/06 701/533 |
| 2009/0248587 A1 | 10/2009 | Van | |
| 2010/0042549 A1* | 2/2010 | Adamczyk | G06Q 10/06 705/80 |
| 2011/0018719 A1 | 1/2011 | Huang et al. | |
| 2011/0196726 A1* | 8/2011 | Poellnitz | G06Q 30/02 705/14.16 |
| 2012/0309424 A1 | 12/2012 | Xiao et al. | |
| 2013/0060586 A1 | 3/2013 | Chen et al. | |
| 2015/0379544 A1* | 12/2015 | Matejka | G06F 16/955 705/14.16 |

\* cited by examiner

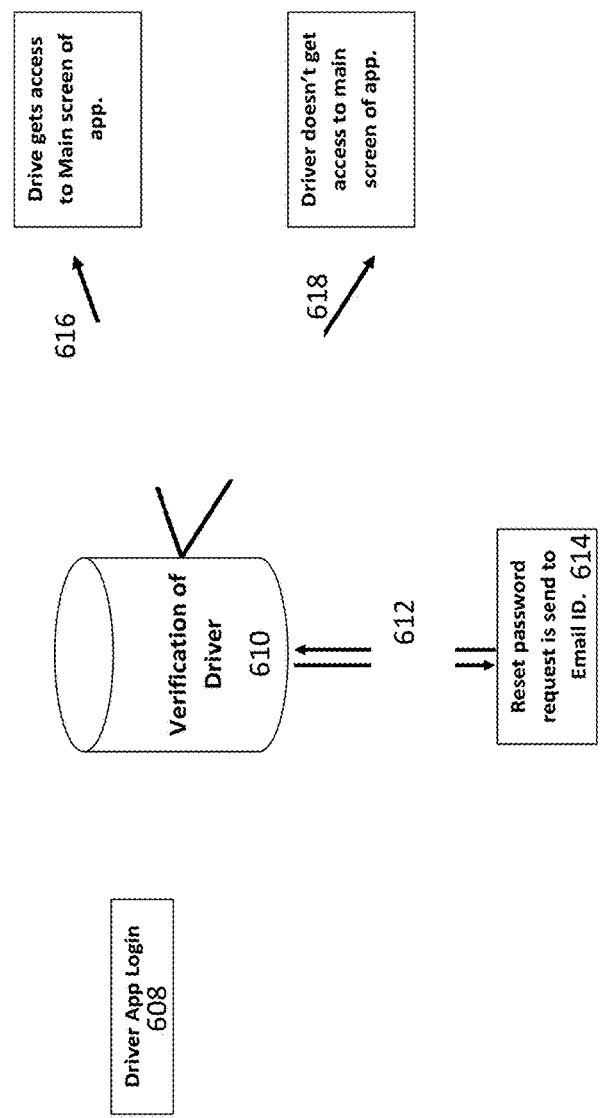
FIG. 6

FIG. 13

Providers 1802 1804 1806

Show [10 ▼] entries                                                                                                                     Search [_____]

| ID | Name | Email | Phone | Photo | Bio | Total Requests | Status | Actions |
|----|------|-------|-------|-------|-----|----------------|--------|---------|
| 30 | jay colon | jcolon731@gmail.com | +12018443411 | View Photo | MALE | 0 | Approved | [Actions ▼] |
| 31 | Louis Paulucci | louispaulucci@yahoo.com | +2018193468 | View Photo | MALE | 0 | Approved | View History |
| 32 | pqr pqr | pqr@gmail.com | +19673902711 | View Photo | Female | 2 | Approved | Decline / Set Target / Get Details / View Details |
| 39 | jessica colon | jcolon109@gmail.com | +2015382788 | View Photo | FEMALE | 0 | Approved | |
| 44 | driver driver | driver@gmail.com | +919673902711 | View Photo | Male | 2 | Approved | [Actions ▼] |
| 45 | andoid android | android@gmail.com | +919673902711 | View Photo | FEMALE | 0 | Approved | [Actions ▼] |

| ID | Name | Email | Phone | Photo | Bio | Total Requests | Status | Actions |
|---|---|---|---|---|---|---|---|---|
| 30 | jay colon | jcolon731@gmail.com | +12018443411 | View Photo | MALE | 0 | Approved | Actions ▾ |
| 31 | Louis Paulucci | louispaulucci@yahoo.com | +2018193468 | View Photo | MALE | 0 | Approved | View History<br>Decline |
| 32 | pqr pqr | pqr@gmail.com | +19673902711 | View Photo | Female | 2 | Approved | Set Target<br>Get Details |
| 39 | jessica colon | jcolon109@gmail.com | +2015382788 | View Photo | FEMALE | 0 | Approved | View Details |

YUR Drivers

Set Target

| From Date | To Date | Amount | Edit | Delete |
|---|---|---|---|---|
|  | 2015-05-29 | 400.00 | Edit | Delete | fare target(s)

Start Date [ ] End Date [ ] Set Target

FIG. 19

METHOD AND SYSTEM FOR RIDE SHARES INVOLVING HIERARCHICAL DRIVER REFERRALS

CROSS-REFERENCE TO RELATED APPLICATIONS

This application is a continuation of U.S. patent application Ser. No. 14/938,129 filed Nov. 11, 2015 and incorporated by reference herein in its entirety, which claims priority to, and incorporates by reference, U.S. provisional patent application No. 62/124,196 filed Dec. 11, 2014.

TECHNICAL FIELD

The present disclosure relates generally to vehicle rideshares. More specifically, embodiments of the present disclosure relate to systems and methods for facilitating vehicle rideshare involving a computerized hierarchical driver referral system and a biometric scan-based authentication of a rideshare driver's identity.

BACKGROUND AND SUMMARY

Historically, passengers who do not wish to drive or use public transportation use taxi cabs to travel from one place to another. Recently, rideshare systems have become available as another source of transportation. Typically passengers request a ride from a driver by using an app on the passenger's mobile device. The mobile app communicates with a server managed by a rideshare system or service and provides information about the passenger's location. In turn, the server sends out a request to drivers in the general vicinity of the passenger's location, and also informs the passenger of average pickup times for drivers in the vicinity. Once the passenger selects a driver and an associated vehicle, the passenger is provided with the driver's information such as a name, a phone number, and an expected time of arrival. After the driver has provided the ride to the passenger, the passenger's credit card or debit card (typically stored in a database coupled to the rideshare server) is charged.

One concern about known rideshare systems is that they do not provide adequate security measures to protect passengers. For example, an unauthorized person can impersonate a ride share driver and provide a ride to an unsuspecting passenger. Another concern is that known rideshare systems do not utilize technology effectively to adequately incentivize new drivers to become part of the riding sharing service.

BRIEF DESCRIPTION OF DRAWINGS

FIG. 6 illustrates a schematic of operations associated with a driver's mobile app according to an embodiment of the present invention.

FIGS. 12-14 illustrate example interfaces showing earnings accumulated via a driver's referral chain according to an embodiment of the present invention.

FIG. 15 illustrates an example interface displaying a driver's earnings history according to an embodiment of the present invention.

FIG. 16 illustrates an example interface showing a passenger's trip history according to an embodiment of the present invention.

FIGS. 18-19 illustrate example interfaces linked to a driver database according to an embodiment of the present invention.

DETAILED DESCRIPTION

Figure 1:
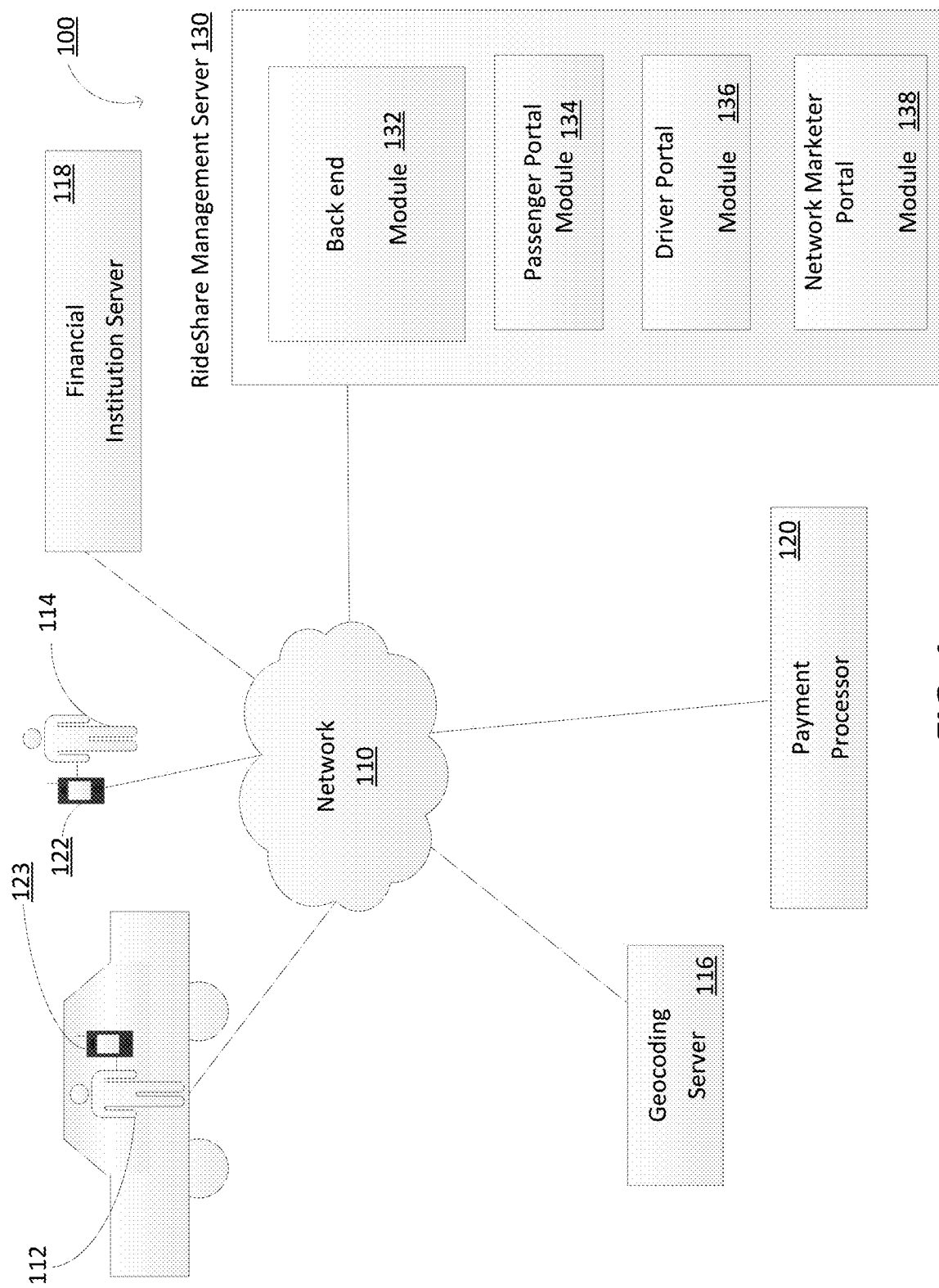
FIG. 1 illustrates an example system for facilitating rideshares utilizing a ride share management server.

In one aspect, the inventive disclosure provided herein generally relates to systems and methods for authenticating ride share drivers using a biometric sensor. When a driver initially registers with the rideshare service, the driver is prompted to provide biometric information via a mobile app running on the driver's mobile device. The biometric information is then stored in a database with a ride share management server in a file associated with the driver's account. Subsequently, when the driver expresses an offer to provide a ride share trip, the server performs an authentication check based on the pre-stored biometric information. Particularly, the driver provides his or her biometric information to the ride share management server via a mobile application on the driver's mobile device. This information is then checked against the stored biometric information in the networked database to authenticate the identity of the driver. If authenticated, the driver receives pick-up information, including the passenger's pickup location and desired destination. In the meantime, the ride share management server notifies the passenger about the details of the rideshare driver and the rideshare vehicle via the mobile app on the passenger's mobile device. Once the driver arrives at the pickup location of the passenger and picks up the passenger, the ride share trip starts.

In some embodiments, the biometric information is stored inside non-volatile memory in or coupled to the driver's mobile device. Subsequently, when offering a rideshare trip, an identity of a driver who offers the rideshare trip is checked (by the mobile app running on the driver's mobile device) against the stored biometric information to authenticate the identity of the driver. However, the comparison of the biometric information received versus the pre-stored biometric information is performed by the rideshare server. Thus, in such implementations, the stored biometric information is transmitted from the driver's mobile device to the rideshare server, prior to the comparison.

Drivers' mobile devices are configured to enable drivers to provide biometric information via a sensor coupled to or otherwise configured within a driver's respective mobile device. A biometric scan can include, for example, fingerprint, voice, iris recognition, or a combination thereof. In some embodiments, a driver's mobile device, a passenger's mobile device, or both can be configured to enable receipt of biometric scans, process such scans to determine if the scan was successful, and transmit such scans to a ride share management server. The ride share management server compares the biometric scan of a driver offering to provide a ride share trip against a stored biometric scan to authenticate the identity of the driver. The biometric scan of a driver can be stored along with other types of driver information such as a name, license information, social security number, car information, picture of driver and the car, ride history of the driver accumulated over time, criminal background check, driver ratings by passenger, etc. In some aspects, a data structure associated with a driver enables storage and manipulation of different types and formats (e.g., alphabetical, numeric, alphanumeric, etc.) of data about a driver. In some embodiments, a passenger can access some of the data relating to a driver. For example, a passenger can access such information at the start of a trip until the trip is over.

In another aspect, the inventive disclosure relates to a computerized method and system for facilitating increased rideshare revenue generation by creating referral chains for a driver when a previously-registered driver (e.g., "Driver A") refers a proposed new driver (e.g., "Driver B") to the rideshare service and the proposed new driver then registers with the rideshare service. In this scenario, the referral chain can provide additional revenue for the previously-registered driver by accumulating a percentage of earnings from the proposed new driver. This referral chain can span a number of levels (e.g., five levels of referrals). In some embodiments, a driver who has been referred by a registered driver is prevented from being referred by another registered driver. In some aspects, a registered driver who refers a new driver provides a referral ID to that is used by the proposed new driver when signing up with the rideshare service. In some other aspects, a registered driver notifies the ride share management server that he or she has provided a referral ID to the new driver. Accordingly, when the new driver registers with the rideshare service, the new driver may be required to provide the referral ID provided by the registered driver. Such a methodology can prevent occurrences where a new driver has been referred by a registered driver but does not provide the referral ID provided by the registered driver in an attempt to avoid sharing his or her earnings with the referring driver.

When a driver who has been referred by another driver signs up with the ridesharing service, a mobile app running on a referring (registered) driver's mobile device is updated to show the referral chain. That is, data relating to the new driver is transferred to the registered driver's mobile app. Thus, embodiments of the present disclosure enable push notifications to be received by an app running on a driver's mobile device. The app running on a driver's mobile device can be configured to receive notifications on-the-fly from a ride share management server. The referral chain of the registered driver can be stored on the registered driver's mobile app, and additionally in a database associated with the rideshare service.

When a driver completes a ride, an electronic payment is processed such that requisite funds amounting to the cost of a ride are transferred from a passenger's financial institution to the rideshare service. For example, a driver who provided the ride can receive 85% of the cost of a ride, and the remaining 15% is retained by the rideshare service. In some aspects, details relating to a passenger's financial institution are stored in a passenger database associated with the rideshare service when the passenger registers with the rideshare service. After receiving the funds, the rideshare service retains a percentage from each driver in a referral chain. In addition, the registered driver who has referred the subject driver also earns a percentage of the earnings. For example, in a referral chain in which driver 1 refers driver 2, and driver 2 offers a ride to a passenger, driver 2 earns 85% of the cost of the ride. The remaining 15% is divided between the rideshare service and driver 1. Thus, in some scenarios, the driver who provided the ride earns 85% of the cost of a ride. The remaining 15% is divided among the rideshare service and the other driver(s) in the referral chain, according to certain percentages. In another example, in which driver 1 refers driver 2, driver 2 refers driver 3, driver 3 refers driver 4, and so on, the rideshare service retains 15% of driver 1's earnings, 11% of driver 2's earnings, 8.5% of driver 3's earnings, 7% of driver 4's earnings, and so on. Similarly, driver 1 earns 4% of driver 2's earnings, 2.5% of driver 3's earnings, 1.5% of driver 4's earnings, and so on. (These percentages can vary, and are examples for discussion purposes only.) In some embodiments, payments from a passenger's financial institution can be processed via a third payment processor acting as an intermediary between the passenger's financial institution and the rideshare service.

In some embodiments, the inventive disclosure relates to a computerized method and system for creating referral chains when a network marketer refers a proposed new driver to the rideshare service and the proposed new driver then registers with the rideshare service. A network marketer, as used herein, is an individual or an entity that is not a registered driver of the rideshare service. A referral chain started by a network marketer can provide a revenue generation stream for the network marketer by accumulating a percentage of earnings from the proposed new driver. Referral chains by network marketers can have features and functionalities that are similar to referral chains by drivers. For example, the referral chain can span a number of levels (e.g., five levels of referrals). A network marketer who refers a new driver provides a referral ID that is used by the proposed new driver when signing up with the rideshare service. In some other aspects, a network marketer notifies the rideshare management server that he or she has provided a referral ID to the new driver. Accordingly, when the new driver registers with the rideshare service, the new driver may be required to provide the referral ID provided by the network marketer. In some embodiments, a network marketer can access the rideshare service via a network marketer portal for providing information to the rideshare server, checking earnings/invoices as a result of earnings from rideshare drivers that are part of the network marketer's referral chain, etc. Percentages of earnings from a network marketer-referred driver can, in some embodiments, be similar or different than driver-referred scenarios discussed above.

Various aspects and examples of the embodiments will now be described. The following description provides specific details for a thorough understanding and enabling description of these examples. One skilled in the art will understand, however, that the embodiments may be practiced without many of these details. Additionally, some well-known structures or functions may not be shown or described in detail, so as to avoid unnecessarily obscuring the relevant description.

FIG. 1 illustrates an example system where a rideshare management server 130 facilitates providing ride share trips to passengers 114 in vehicles driven by ride share drivers 112. Passengers 114 and ride share drivers 112 own, operate, or otherwise have access to mobile devices 122. Determining a trip can, in some embodiments, involve queries to a geocoding server 116. A payment processor 120 is used to disburse payments to ride share drivers based on the cost of a rideshare trip. A passenger can pay the cost of a rideshare trip using a debit card or a credit card associated with a financial institution server 118.

It will be understood that the ride share management server 130, which can be referred to as the "rideshare server," can be a single server or a plurality of interconnected servers that are configured to exchange information. Further, such a server or a plurality of servers can be cloud-based or can be physical servers.

In the exemplary scenario shown in FIG. 1, a passenger 114 is waiting at a geographical location for a rideshare driver 112 to arrive and pick up the passenger 114. Passenger 114 requests rideshare server 130 for a ride share trip by launching a mobile application on the passenger's mobile device 122. The request typically includes information relating to the passenger's geographical location (e.g., latitude longitude) obtained via a location mechanism (e.g., a GPS sensor) on the passenger's mobile device 122 and an intended destination provided by the passenger 114. In some instances, a passenger 114 can request an estimated cost of the rideshare trip from the rideshare server 130.

In some embodiments, a mobile application associated with the rideshare service can function dually as a mobile application for a passenger 114 as well as that for a driver 112. Thus, depending on whether an individual is logging in as a passenger 114 or as a driver 112, the same mobile application can be used for both purposes. For purposes of discussion and illustration, the terms "a mobile application running on a driver's mobile device," "a driver's mobile app," and "a driver app" would be considered analogous. Similarly, the terms "a mobile application running on a passenger's mobile device," "a passenger's mobile app," and "a passenger app" would be considered analogous.

A driver 112 in the vicinity offering to provide a rideshare trip launches a mobile application on the driver's mobile device 123. In some embodiments, the mobile application requests the driver 112 to provide his or her biometric information to the rideshare server 130 every time a driver launches the mobile application for offering a rideshare trip. A driver's mobile device 123 can be configured to enable a driver 112 to provide biometric information via a sensor coupled to or otherwise configured within a driver's respective mobile device 123. A biometric scan can include, for example, fingerprint, voice, or iris recognition, or a combination thereof. In some embodiments, the driver's mobile device 123 can be configured to enable receipt of biometric scans, process such scans to determine if the scan was successful, and transmit such scans to a rideshare server 130. The rideshare server 130 checks the biometric information provided by the driver offering to provide the ride share trip against the stored biometric information in a networked database to authenticate the identity of the driver 112.

If authenticated, the driver 112 is provided with the destination of the passenger 114 and a pickup location of the passenger 114. The passenger 114 is notified of details of the rideshare driver 112 and the rideshare vehicle, via the mobile app on the passenger's mobile device 122, by the rideshare server 130. For example, the ride share server 130 can provide the passenger 114 with a name and contact information (e.g., phone number, email, etc.) of the driver 112, a photograph of the driver 112, a make, year, model and photograph of the vehicle that the driver 112 is driving.

In some instances, the rideshare server 130 provides an estimate of the rideshare trip to the passenger 114. The wait time for the passenger 114 waiting for the rideshare driver 112 to arrive at the passenger's pickup location is typically a couple of minutes or less. The driver 112 arrives at the pickup location of the passenger 114, picks up the passenger 114 and the ride share trip starts. In some embodiments, a trip starts when a driver clicks on a button to start a trip using the mobile application running on the driver's mobile device 123. In some scenarios, more than one driver can respond to rideshare server 130 with an offer to provide a rideshare trip to passenger 114. In such a scenario, the ride share server 130 can choose a driver 112 randomly, or can choose a driver 112 who is closest to the passenger 114.

In some embodiments, the rideshare server 130 communicates with a geocoding server 116 to provide real time navigation directions to the driver 112, on the way to the passenger's destination. For example, a rideshare server 130 can query (e.g., via an API call) the geocoding server 130 with the intended destination provided by the passenger 114 to obtain the real time navigation directions. The geocoding server provides the navigation directions (e.g., route information of the rideshare trip on a map) to the rideshare server 130 which is conveyed in real time to a mobile application running on the driver's mobile device 123, and optionally to the passenger's mobile device 122. The mobile application running on the driver's mobile device 123 can also compute information relating to a net distance traveled from the passenger's pickup location, a time of travel, etc. Such information can be used to calculate a total cost of the rideshare trip. In some embodiments, geocoding server 116 performs some or all of these computations, and provides the same to the mobile application running on the driver's mobile device 123.

In some embodiments, a passenger 114 goes through a one-time registration process (usually at any time before the first rideshare trip of the passenger 114) in which the passenger 114 provides his or her details, e.g., name, email, phone number, credit/debit card information, name of a financial institution associated with the credit/debit card, etc. to the rideshare server 130. In some embodiments, information relating to a passenger 114 is stored in a networked database (e.g., as a data structure) and can be viewed and/or edited by the passenger 114 via a passenger portal module 134 accessible by any electronic device connected to the Internet, including the mobile application running on the passenger's mobile device 122. In some embodiments, the mobile application running on the passenger's mobile device 122 stores a copy of the passenger's personal and financial information.

When the passenger 112 arrives at the intended destination, the rideshare trip ends. Information relating to the rideshare trip, e.g., duration of trip, distance traveled, route taken, etc. is also obtained by the mobile application running on the driver's mobile device 123. In some embodiments, the mobile application running on the driver's mobile device 123 calculates the total cost of the rideshare trip, e.g., on the basis of a monetary value per unit time of rideshare travel. In some embodiments, such information is communicated to the rideshare server 130. The rideshare server 130 typically provides that information (partially or entirely) to the mobile application running on the passenger's mobile device 123. In some embodiments, the mobile application on the passenger's mobile device 123 also provides an option to pay a tip to the rideshare driver 114. After reviewing the details of the trip, a passenger 112 can approve of the payment of the cost of the trip via the mobile application running on the passenger's mobile device 123. In some embodiments, the mobile application running on the driver's mobile device 123 goes offline, for example, breaks off communication with the rideshare server 130 when a trip ends. Thus, in such embodiments, a driver who wishes to offer to provide a subsequent rideshare trip re-launches the mobile application, and re-scans his or her biometric information for authentication.

Upon receiving the passenger's approval, in some embodiments, the rideshare server 130 communicates with a payment processor 120 (typically via an API call). Payment processor 120 is a third party financial services provider that allows both private individuals and businesses to accept payments over the Internet. For example, the payment processor 120 can initiate payment transactions associated with payment of the cost of the trip from the passenger's financial institution server 118.

In some embodiments, a second driver 112 shares his or her earnings with a first driver 112 in a scenario in which the first driver 112 has referred the second driver 112 to sign up with the rideshare service as a driver. Thus, embodiments of the disclosed system facilitate the creation of referral chains which can provide residual income to drivers, after funds amounting to the cost of a rideshare trip is received from a passenger's financial institution.

In some optional embodiments as shown in FIG. 1, the rideshare server 130 includes a backend module 132, a passenger portal module 134, a driver portal module 136, and a network marketer portal module 138. Typically, the passenger portal module 134 and the driver portal module 136 are accessible by electronic devices such as mobile devices, laptops, desktops, tablet PCs, etc. connected to the Internet as well as mobile devices including but not limited to the driver's mobile device 122, passenger's mobile device 123, the geocoding server 116, and the payment processor 120. In some embodiments, the network marketer portal module 138 is accessible via the web only, and not via mobile applications on mobile devices. In some other embodiments, the network marketer portal module 138 can be accessible via mobile applications running on mobile devices. The network marketer portal module 136 can, for example, be accessed by a network marketer module to provide information about a proposed new driver to the rideshare server 130, or even directly refer a proposed new driver via the network marketer portal module 136. A network marketer can also receive referral IDs generated by the rideshare server 130 to be shared or sent (e.g., via a social media network or in an email communication) to the proposed new driver.

Thus, embodiments of the present disclosure enable both drivers 112 and passengers 114 to view their profile and affiliated information using a passenger portal module 134 and a driver portal module 136 hosted by the rideshare service. For example, both passengers and drivers can respectively view their profile information, their trip history, their payment history, their invoices, etc. The back end module 132 is typically involved in calculation of payments, maintenance and manipulation of passenger and driver data stored in networked databases, etc. In some embodiments, functionalities of the back end module 132 can, in whole or in part, be performed by one or more of the portal modules disclosed herein, and vice versa. Furthermore, in some embodiments, the rideshare server 130 can include a single module for performing various functionalities.

Examples of mobile devices 122 and 123 include but are not limited to tablets, mobile smart phones, personal digital assistants, wearable consumer devices, etc. These mobile devices can run, for example, the popularly-known ANDROID™' IPHONE™, and WINDOWSPHONE™ platforms. It will be understood that there is no limitation imposed on the number of mobile devices, mobile device types, brands, vendors and manufacturers that may be used with embodiments of the present disclosure.

Electronic data communications between elements shown in FIG. 1 can be achieved via one or more networks 110, such as, but not limited to, a Local Area Network (LAN), Wireless Local Area Network (WLAN), Personal area network (PAN), or wireless wide area network (WWAN), enabled with technologies such as Global System for Mobile Communications (GSM), Personal Communications Service (PCS), Bluetooth, Wi-Fi, Fixed Wireless Data, 2G, 2.5G, 3G, 3G LTE, LTE Advanced, 4G, general packet radio service (GPRS), messaging protocols such as, TCP/IP, SMS, MMS, instant messaging, or any other wireless data networks or messaging protocols. Although not shown in FIG. 1, it can be further understood that such communications may include one or more secure networks, gateways, or firewalls that provide information security from unwarranted intrusions and cyber attacks. In some embodiments, the landmark server 130 includes functionality to allow it to communicate, for example, by using application programming interfaces (APIs), with various elements shown in FIG. 1.

Figure 2:
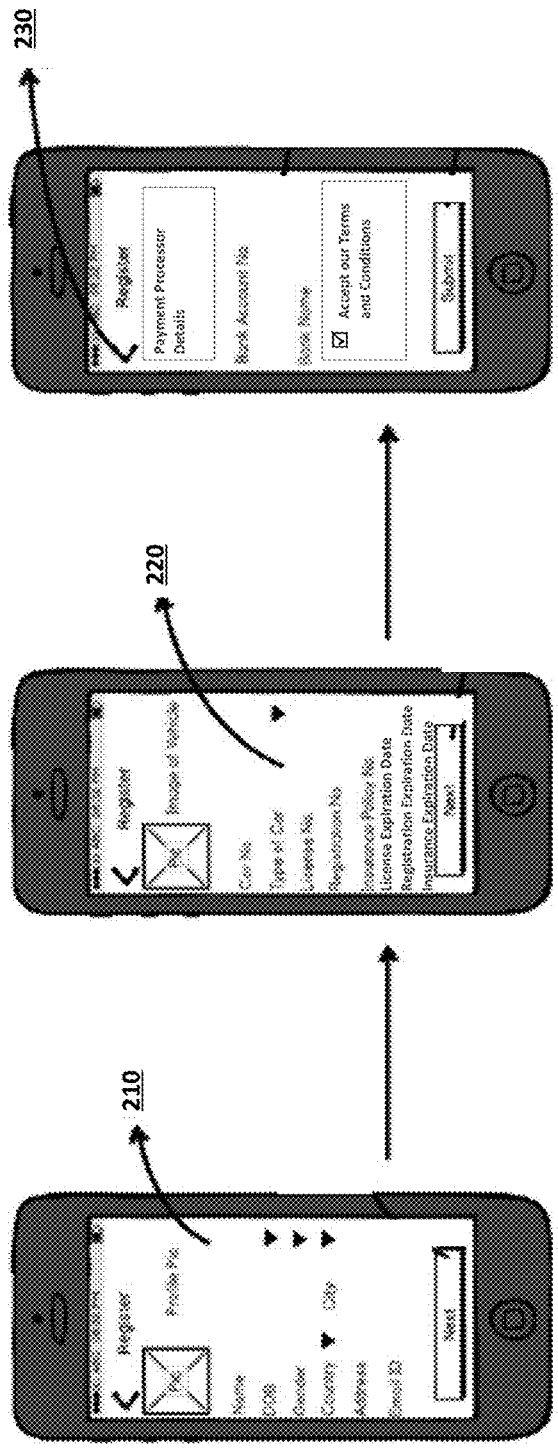
FIG. 2 illustrates example registration screens of a mobile device interface for registering drivers with an embodiment of the ride share management server, according to an embodiment of the present invention.

FIG. 2 illustrates exemplary registration screens of a mobile device interface for registering drivers with an embodiment of the rideshare server, according to an embodiment of the present invention. For example, upon launching a mobile application associated with the rideshare server 130 for the first time, a mobile application running on a driver's mobile device displays screen 210. Screen 210 shows various exemplary driver-related information fields such as a name field, a date of birth field, a gender field, a country field, a city field, an address field, and an email id field. For example, in some scenarios, the date of birth information can be used to determine an age of the driver, such that drivers under the age of twenty-one, for instance, are not allowed to sign up as drivers with the rideshare service. In such scenarios, the mobile application displays a message "You are Not Eligible to Drive." Upon filling up the fields displayed on this screen, a driver clicks on a "Next" button to land at screen 220. If the date of birth provided by the driver is a current date, then the mobile application displays a message on the screen of the mobile device. If the email id provided by the registering driver is in a wrong format, then the mobile application displays a message "Incorrect Email ID format." Screen 210 also shows an option for a driver to upload his or her photograph via the mobile application running on the driver's mobile device, e.g., either by taking a photograph via the camera on the mobile device or uploading a pre-stored photograph saved in a memory of the mobile device. Screen 220 shows various exemplary fillable information fields of a vehicle that can be used to provide a rideshare trip. Example of such fields shown in screen 220 are a vehicle number, a type of vehicle, a license number of the driver, a registration number of the vehicle, an insurance policy number of the vehicle, a license expiration date of the driver, a registration expiration date of the driver, an insurance expiration date, etc. Screen 220 also shows an option for uploading a photograph of the vehicle. Upon filling up the fields displayed on this screen, a driver clicks on a "Next" button to land at screen 230. Screen 230 shows a driver's bank-related information such as a bank name and a bank account number, for receiving earnings associated with a ride share trip. Screen 230 also shows details to be filled by a driver for payments involving a (third party) payment processor. In some aspects, a driver can enter the information on the displayed registration screens 210, 220, and 230 and edit them if he or she desires. Such information is finally communicated from the mobile application running on the driver's mobile device to the rideshare server 130, after the driver clicks a "Submit" button. In some embodiments, if the driver skips filling up any field, then the mobile application displays a message "All Fields are Mandatory." In some embodiments, information provided by a driver during a registration process is communicated to the rideshare server 130 for storage in a database. In some embodiments, some or all of the information provided by a driver during a registration process can be saved on the driver's mobile device. In some embodiments, the rideshare server 130 keeps track of various dates, e.g., dates of registration renewal, license renewal, insurance renewal etc. Accordingly, in such embodiments, the rideshare server 130 sends an email to the driver in advance of the renewal date(s) so that the driver can take necessary actions.

Figure 3:
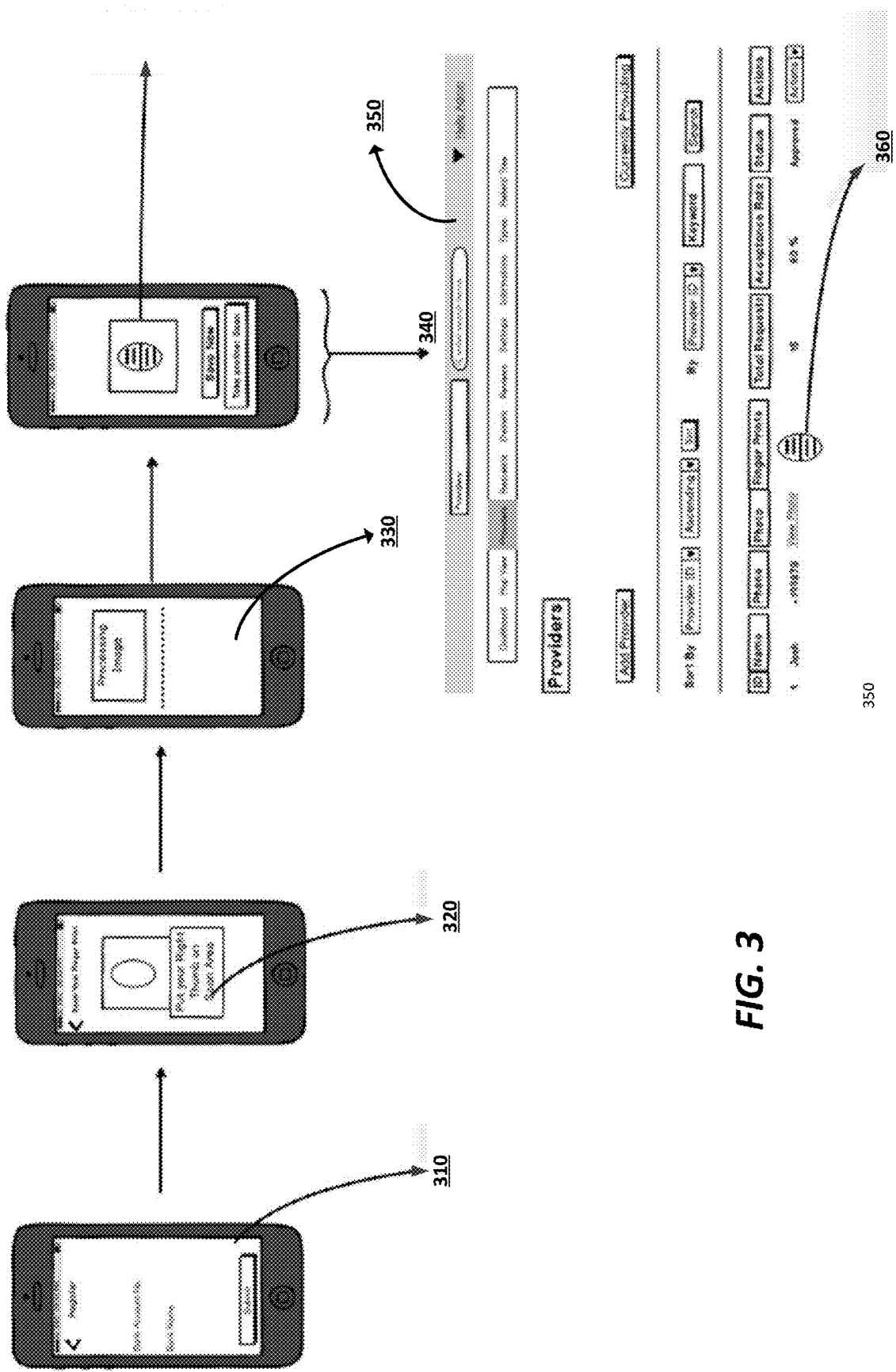
FIG. 3 illustrates a mobile device interface for receiving biometric information from drivers, according to an embodiment of the present invention.

FIG. 3 illustrates a mobile device interface for receiving biometric information from drivers, according to an embodiment of the present invention. Screen 310, used for entering a driver's bank information for receiving earnings associated with a rideshare trip is similar to screen 230 shown in FIG. 2. Screen 320 shows a predetermined scanning area on the screen of a driver's mobile device. The predetermined scanning area is a region inside which a driver can place his or her finger (right thumb, for example) in connection with providing the driver's biometric information. Drivers' mobile devices are configured to enable drivers to provide biometric information via a sensor coupled to or otherwise configured within a driver's respective mobile device. Screen 330 shows a message displayed on the screen of a driver's mobile indicating that the mobile application is processing an image associated with the biometric scan of a driver's finger. If the mobile application on the driver's mobile device determines that the biometric scan was successful, screen 340 shows an option to save the biometric scan. In some optional embodiments, as shown in screen 340, the mobile application on the driver's mobile device can provide an option to re-take another biometric scan. In some embodiments, information provided by a driver during a registration process is communicated to the rideshare server 130 for storage in a database. In some embodiments, some or all of the information provided by a driver during a registration process can be saved on the driver's mobile device.

FIG. 3 also displays a portion of a computer-implemented interface 350 that is linked to a database which stores the driver's biometric information. Interface 350 displays, for example, a driver ("provider") with an id "1," a name "Josh" having a biometric scan 360 linked to his employee account. Embodiments of the disclosed system utilize the biometric scan to authenticate the identity of a driver any time the driver launches the mobile application. Interface 350 also displays additional driver-related details such as a phone number, a linked photograph of a driver, a total number of trips that the driver has offered, and an approval status corresponding to whether the driver was approved by the system based on his background and driving history. Interface 350 also provides a drop-down menu displaying selectable actions that can be taken by an individual viewing this interface. Although FIG. 3 displays fingerprint recognition as a biometric, embodiments of the disclosed system can also different types of biometric scan, such as, fingerprint, voice, or iris recognition, or a combination thereof.

Figure 4:
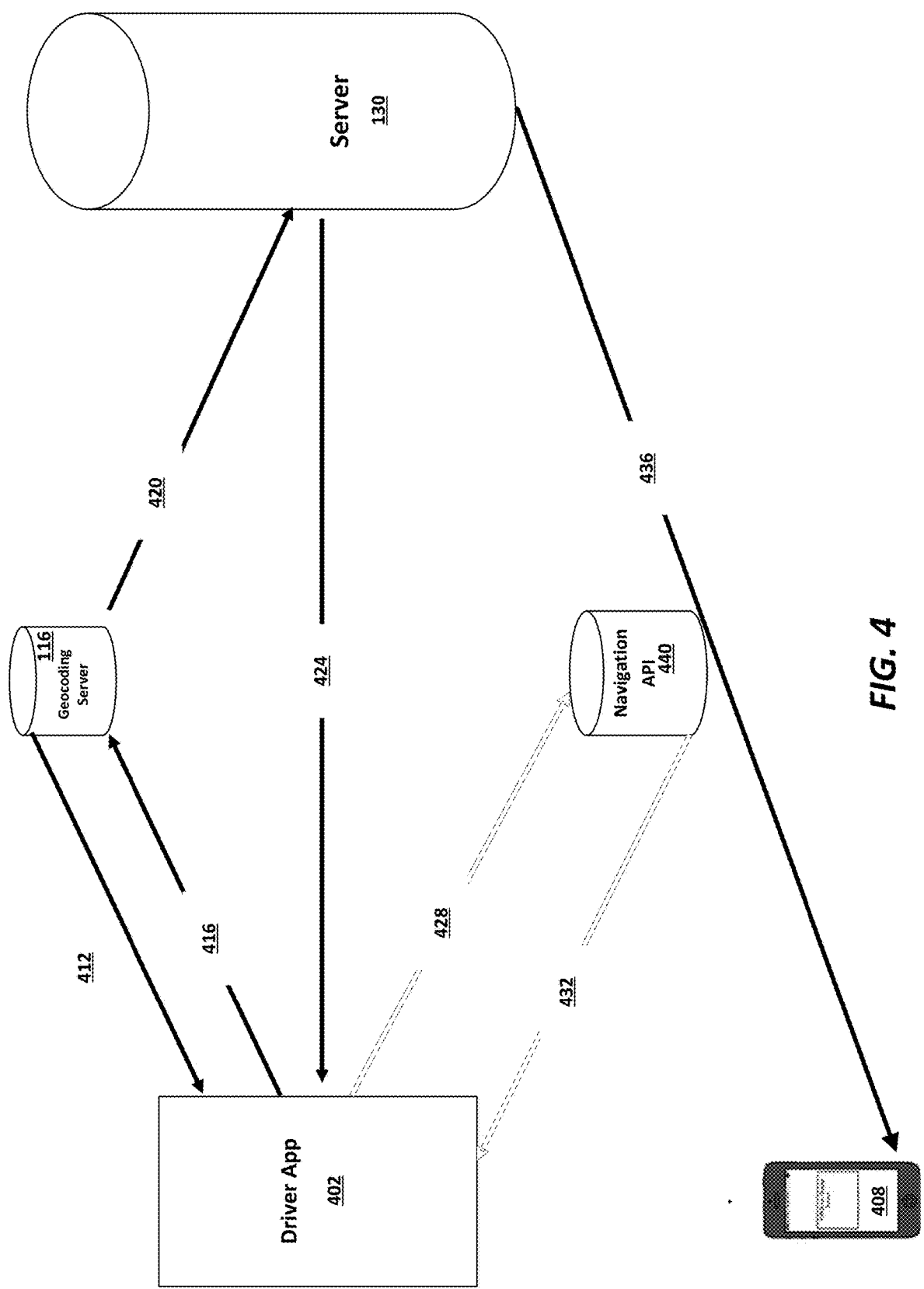
FIG. 4 illustrates a schematic of discrete pairwise operations involving a driver's mobile app, a passenger's mobile app, a ride share management server, a navigation API, and a geocoding server associated with start of a trip, according to an embodiment of the present invention.

FIG. 4 illustrates a schematic indicating operations involving a driver's mobile app 402, a passenger's mobile app 408, a rideshare server 130, a navigation API 440, and a geocoding server 116 associated with start of a trip, according to an embodiment of the present invention. It is noted that the operations shown in FIG. 4 are not necessarily performed in a sequence or in an order of any sort. According to some embodiments, a driver who offers to provide a rideshare trip provides a biometric scan via the driver's mobile app. In some embodiments, the biometric scan is compared against a pre-stored scan of the driver stored in the driver's mobile phone. For example, the pre-stored scan can be a scan provided by the driver at the time of registration. The process of comparing the biometric scan received from a driver with the pre-stored scan can, in some embodiments, be performed by the driver's mobile app 402. In some other embodiments, the driver's mobile app transmits the biometric scan to rideshare server 130 for comparison against a pre-stored scan.

If the driver is authenticated (412), a driver receives the passenger's pickup location and the passenger's intended destination from geocoding server 116 (or, in some embodiments, from the rideshare server 130) displayed on a map. In some embodiments, the driver's mobile app 402 integrates the received information updating the map displayed on the driver's mobile device with, for example, a real-time indication of the driver's location and the passenger's pickup location. For example, in some embodiments, the driver app 402 can display a marker on a map corresponding to the driver's location and the passenger's pickup location. Further, as the driver travels towards the passenger's pickup location, the driver marker is shown to accordingly move on the map. In some embodiments, the driver app 402 sends (416) real-time information relating to the updated map, e.g., displaying the markers to the geocoding server 116. In some embodiments, the geocoding server transfers the information received from the driver app 402 to the rideshare server 130 in real time. In some other embodiments, the driver app 402 sends real-time information relating to the updated map, e.g., displaying the markers directly to the rideshare server 130. It will be understood and appreciated that functionalities wherein the rideshare server 130 obtains a driver's real-time location allow the rideshare server 130 to track the driver's location. Upon detecting that the driver has reached the location, the driver receives (at step 424) a notification of a start of a trip from the rideshare server 130. In some embodiments, a driver first informs (via the driver's mobile app 402) the rideshare server 130 that he or she has arrived at the passenger's pickup location before receiving a notification of a start of the trip from the rideshare server 130. In some scenarios, a driver clicks on a Start Trip button via driver app 402 to start a rideshare trip. Accordingly, the rideshare server 130 is notified of the driver's input via the driver app 402. In some embodiments, the passenger app 408 receives a notification of a start of a trip from the rideshare server 130. In some embodiments, the driver app 402 sends (step 428) a passenger's pickup location and intended destination of the passenger to a navigation API 440. In turn, the navigation API 440 guides the driver by providing (step 432) turn-by-turn directions to the intended destination.

Figure 5:
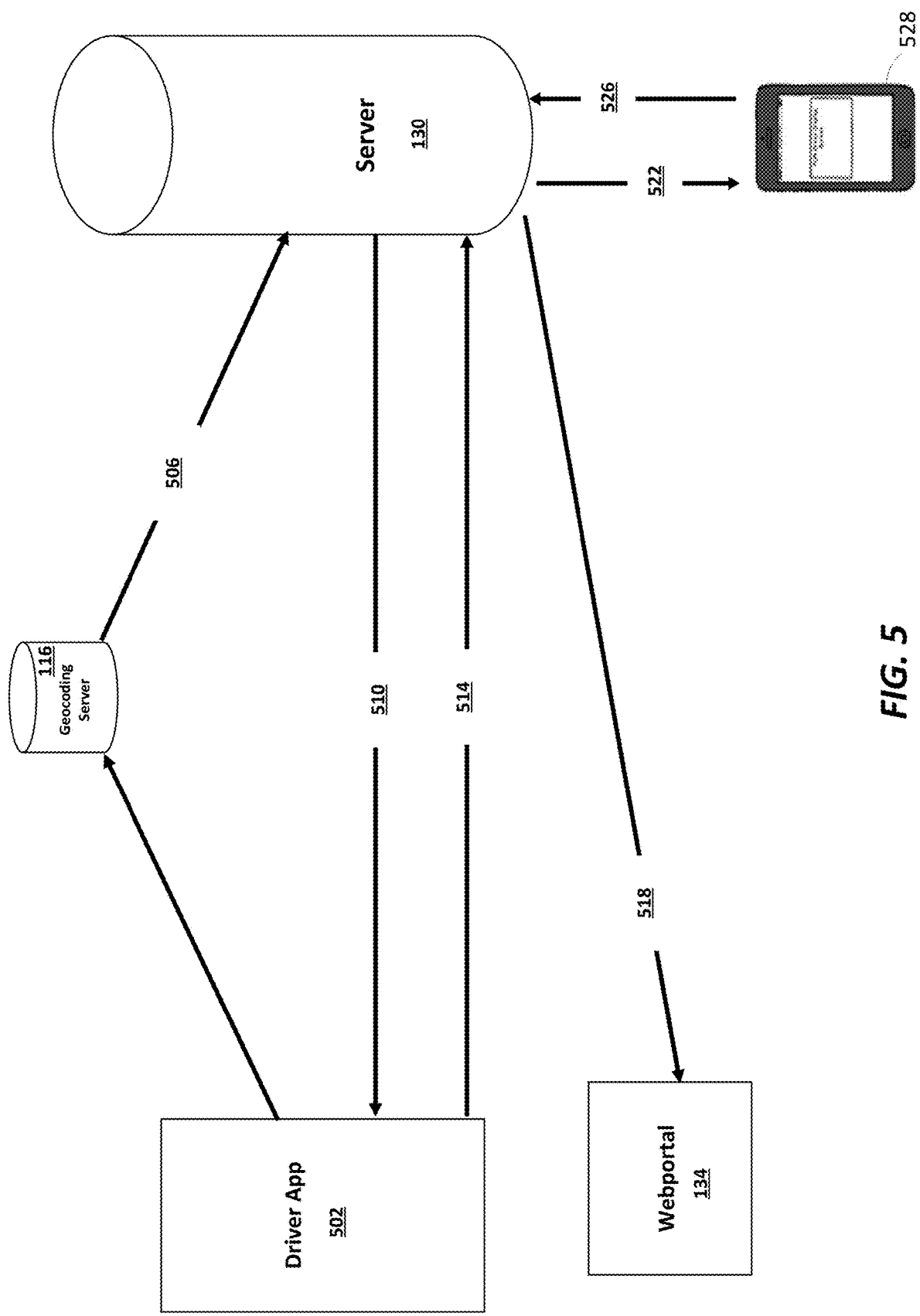
FIG. 5 illustrates a schematic of discrete pairwise operations involving a driver's mobile app, a passenger's mobile app, a ride share management server, a passenger portal, and a geocoding server associated with end of a trip, according to an embodiment of the present invention.

FIG. 5 illustrates a schematic indicating discrete pairwise operations involving a driver's mobile app 502, a passenger's mobile app 528, a rideshare server 130, a web portal 134, and a geocoding server 116 associated with end of a trip, according to an embodiment of the present invention. It is noted that the operations shown in FIG. 5 are not necessarily performed in a sequence or in an order of any sort. In some embodiments, geocoding server 116 provides (step 506) information relating to a driver's current location, intended destination of the rideshare trip, a total time traveled, a total distance traveled, toll locations on the driver's route, etc. to the rideshare server 130. Upon detecting that the driver has arrived at the intended destination, the rideshare server 130 informs (step 510) the driver's mobile app that the driver has arrived at the intended destination. The driver's mobile app 502 responds (step 514) to the rideshare server 130 that the rideshare trip has ended. Accordingly, an invoice reflecting a summary of the rideshare trip is sent (step 522) by the rideshare server to the passenger's mobile device. In some instances, a passenger can optionally provide (step 526) a tip amount and a rating/comments for the driver, via the passenger's mobile app 528. In some embodiments, rideshare server 130 provides (step 518) information relating to the rideshare trip, e.g., an invoice, a type of vehicle used, a distance traveled, a tip amount paid by the passenger to the driver, a rate per unit distance of travel that is used to calculate the fare, etc. This information can, in some embodiments, be provided to either or both of the driver and the passenger's account, which can be accessed via web portal 134, e.g., a driver web portal for a driver and a passenger web portal for a passenger.

FIG. 6 illustrates exemplary operations associated with a driver's mobile app associated with authenticating an existing driver's identity, according to an embodiment of the present invention. For example, step 602 displays a mobile screen displaying an interface to capture a biometric scan of a driver's right thumb for authentication of a driver's identity. Accordingly, after a driver has provided his or her biometric scan, the biometric scan provided is compared against a driver's pre-stored biometric scan. In some embodiments, the comparison is performed at the driver's mobile device. In some embodiments, a rideshare server 130 performs the comparison, after receiving the biometric scan provided by the driver via the mobile app. If the biometric scan provided (at step 604) by the driver matches with the pre-stored biometric scan, then the driver is allowed to proceed to the next step of launching the mobile app, e.g., the mobile app goes online allowing the driver to use the mobile app. However, if there is a mismatch, the driver's mobile app does not allow the driver to proceed further, e.g., step 606. FIG. 6 also displays operations associated with a driver's mobile app, after a driver is authenticated successfully. At step 608, a driver logs in using login credentials such as a login id/password on his or her mobile device. The driver's credentials are verified (step 610). If the driver indicates that he or she has forgotten (step 612) their credentials, then an automated reset credentials link is sent to the driver by the rideshare server 130 via email. If a driver's credentials are successfully verified, then the driver is allowed (step 616) access to the main screen of the mobile app. Otherwise, a driver is not allowed (step 618) access. In some embodiments, a driver is provided a unsuccessful verification message, if the driver's credentials are not verified successfully.

Figure 7:
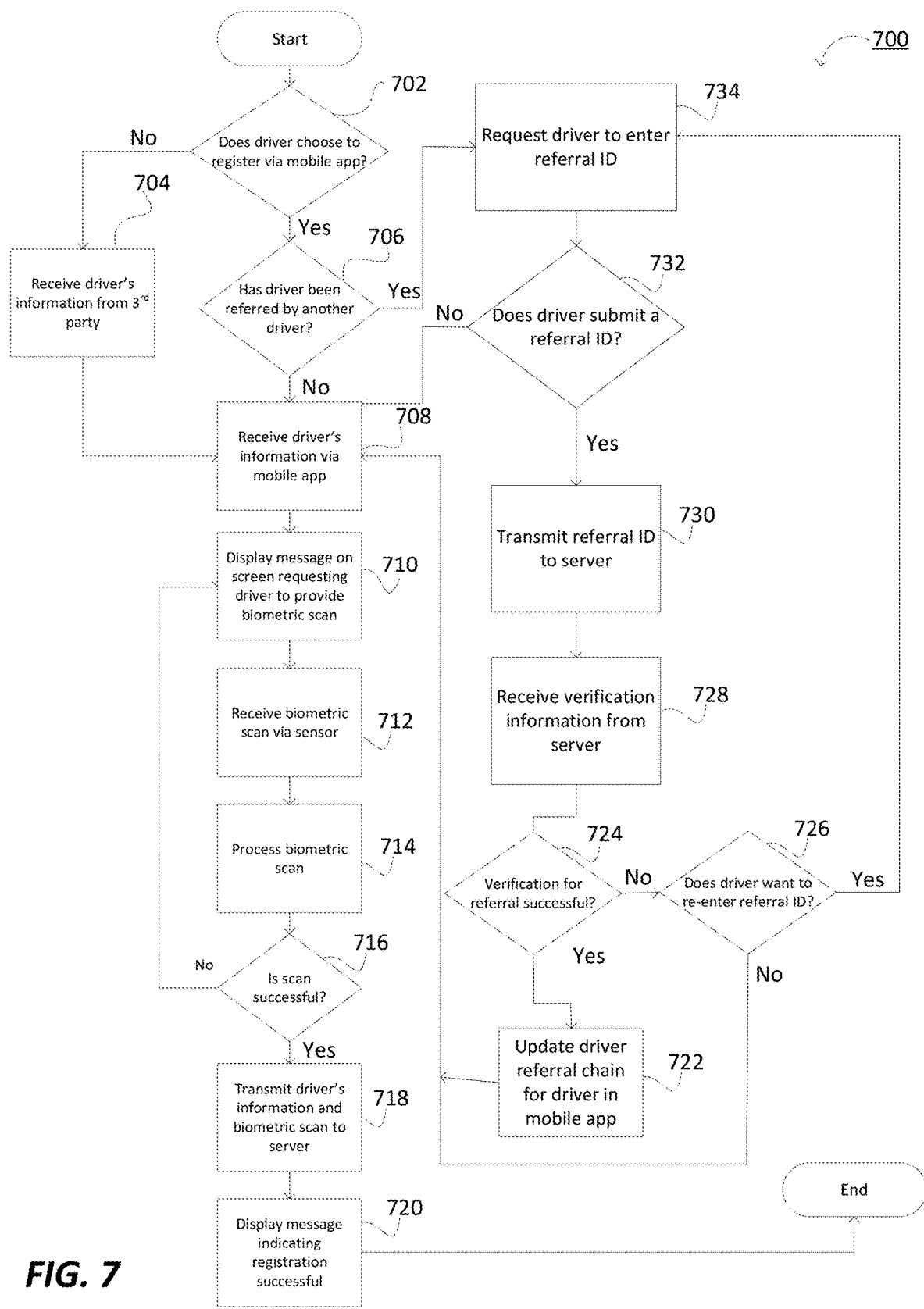
FIG. 7 illustrates a flow diagram showing method steps by a mobile app for registering a driver according to an embodiment of the present invention.

FIG. 7 illustrates a flow diagram showing method steps of a process 700 by a mobile app for registering a driver on a mobile application running on a driver's mobile device, according to an embodiment of the present invention. Starting at step 702, the process determines whether the driver chooses to register and provide his or her information via the mobile app. In some embodiments, a driver can choose to register via a third party app such as a social media network app, in lieu of, or in addition to, utilizing the mobile app (associated with the presently disclosed system) for entering his or her information. In such embodiments, the process can receive a driver's information from one or more respective third parties. In some embodiments, the disclosed system allows driver referrals in which an existing driver can refer a proposed driver to the system. Thus, the process determines (for example, based on information received from rideshare server) whether the registering driver has been referred by another driver, at step 706. If the process determines that the registering driver has been referred by another driver, then the process jumps to step 722 and continues thereafter.

If, however, the process determines that the registering driver has not been referred by another driver, then the process moves to step 708 in which the mobile app receives information pertaining to the driver and the associated vehicle. In some embodiments, the mobile app running on the driver's mobile device also provides information identifying the driver's mobile device and the mobile app. For example, the mobile app can provide a mobile device's International Mobile Equipment Identity (IMEI) number, a mobile app ID, a type and version of the operating system running on the driver's mobile device, the operating system ID of the driver's mobile device, etc. At step 710, the process displays a message on the screen of the driver's mobile device requesting the driver to provide a biometric scan. After receiving (at step 712) a biometric scan from the driver, the biometric scan is processed (at step 714). For example, the mobile app applies image processing methodologies to determine the edges, boundaries, minutiae of the biometric scan. In some scenarios, a biometric scan may not be correctly processed, for example, due to unrecognized artifacts in the biometric scan, or when the information in the biometric scan is not sufficient. Thus, the process determines (at step 716), if the scan is successful. If the scan is successful, the process moves to step 718 in which information relating to the scan is sent to the rideshare server 130. If, however, the scan is not successful, the process lops back to step 710 in which the registering driver is requested to provide a biometric scan. Upon detecting a successful scan, the process displays (at step 720) a message on the screen of the mobile device indicating that registration was successful, and the process terminates thereafter.

In some embodiments if the process determines that the registering driver has been referred by another driver, then the process enters step 734 in which the process requests the registering driver to provide a referral ID. Upon receiving an input from the registering driver, the process determines (at step 724) whether the registering driver submitted a referral ID, or not. In some scenarios, a driver casually entering information via the mobile app may inadvertently enter an option indicating he or she has been referred by another driver, but then realize later that the option was incorrectly entered. In such scenarios, the driver may not have a referral ID to provide. Thus, the process (at step 724) whether the registering driver submitted a referral ID, or not. At step 726, the mobile app communicates the referral ID to the rideshare server 130. The server, in turn, sends verification information to the mobile app verifying (or, denying) the validity of the referral ID. This functionality, as can be appreciated, is to prevent a referral ID from being used multiple times or being used by unrecognized individuals associated with the referral ID, thereby preventing fraud. Based on the received verification information, the process determines if the verification for the referral ID was successful, at step 730. If the verification was successful, the process moves to step 734 in which the referral chain setting in the driver's mobile app is updated. For example, the referral chain setting in the driver's mobile app can reflect the name of the driver who referred the registering driver, a number of hierarchical levels included in the referral chain of the registering driver, etc. If, however, verification of the referral ID was unsuccessful (at step 730), the mobile app provides (at step 732) the option to the registering driver to re-enter the referral ID, and the process loops back to step 722.

Figure 8:
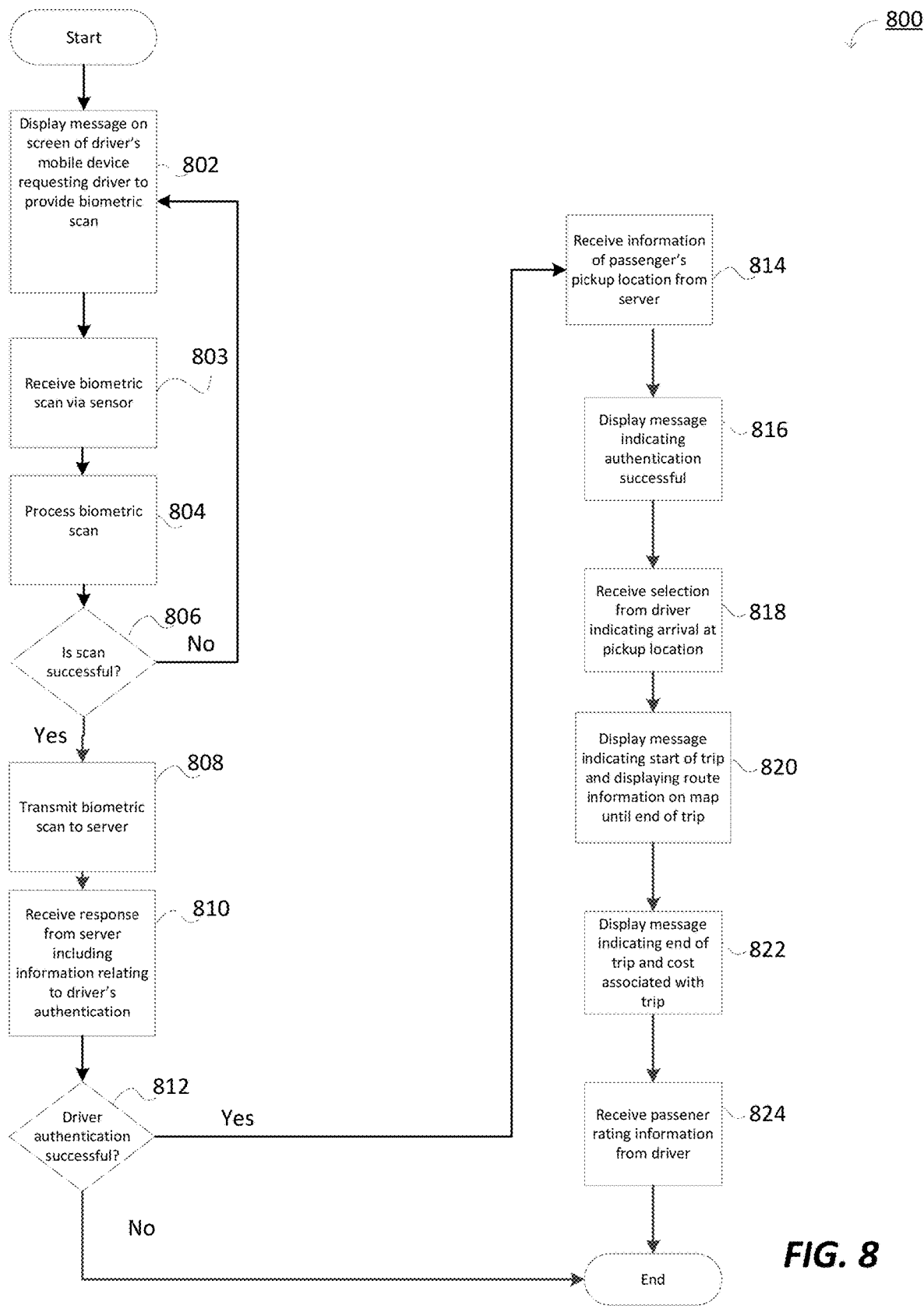
FIG. 8 illustrates a flow diagram showing method steps by a mobile app running on a driver's mobile device in connection with a driver offering to provide a rideshare trip according to an embodiment of the present invention.

FIG. 8 illustrates a flow diagram showing method steps of a process 800 by a mobile app running on a driver's mobile device in connection with a driver offering to provide a rideshare trip, according to an embodiment of the present invention. Starting at step 802, the process displays a message on a driver's mobile device requesting the driver to provide a biometric scan. Thus, in some embodiments, the driver's mobile app stays offline unless the driver provides his or her biometric scan. After receiving (at step 803) a biometric scan from the driver, the biometric scan is processed (at step 804). For example, the mobile app applies image processing methodologies to determine the edges, boundaries, minutiae of the biometric scan. In some scenarios, a biometric scan may not be correctly processed, for example, due to unrecognized artifacts in the biometric scan, or when the information in the biometric scan is not sufficient. Thus, the process determines (at step 806), if the scan is successful. If the scan is successful, the process moves to step 808 in which information relating to the scan is sent, in some optional embodiments, to the rideshare server 130. If, however, the scan is not successful, the process lops back to step 802 in which the driver is requested to provide a biometric scan.

The process receives (at step 810) a response from the rideshare server 130, the response including information relating to authentication of a driver's identity. Based on the response, the process determines (at step 812) whether the authentication was successful. If the authentication was unsuccessful, the process terminates. If, however, the authentication was successful, the process moves to step 814 in which the process receives information pertaining to a passenger's pickup location (e.g., in the form of a latitude longitude or a street address) from the rideshare server 130.

In some embodiments, the pickup location is displayed on a map. In some instances, information included in the map is provided by a geocoding server 116 to the rideshare server 130 which then conveys the same to the driver's mobile app via the Internet. At step 816, the process displays a message on the screen of the driver's mobile device indicating that the authentication was successful. In some embodiments, the message indicating successful authentication can be received prior to the process receiving the passenger's pickup location from the rideshare server 130. After the driver drives to the passenger's pickup location, in some embodiments, the process waits for a selection from the driver indicating arrival at the passenger's pickup location. After receiving (at step 818) a selection from the driver indicating arrival at the passenger's pickup location, the process displays (at step 820) a message indicating a start of a rideshare trip, assuming the passenger gets in the driver's vehicle. In some embodiments, the process displays route information relating to the rideshare trip on a screen of the driver's mobile device in real-time until the passenger arrives at the passenger's intended destination. The route information, for example, can be obtained from a geocoding server 116. Upon arriving at the passenger's intended destination, the process displays an indication of the end of the rideshare trip and a cost associated with the rideshare trip. In some optional embodiments, the process enables a driver to enter (at step 824) passenger rating information (e.g., on a five star scale, or some other scale) via the mobile app running on the driver's mobile device. The process terminates thereafter. In some embodiments, upon completion of a trip, the mobile app running on the driver's mobile device goes offline, i.e., breaks network connections with the rideshare server 130. Accordingly, in such embodiments, a driver provides his or her biometric scan via the mobile app, for the mobile app to come back online. In some embodiments, the process of matching or comparison a driver's biometric scan with a pre-stored scan can be performed at the driver's mobile device, e.g., by the mobile app running on the driver's mobile device. In such embodiments, the mobile app does not necessarily need to send the biometric scan to the rideshare server 130, and accordingly, no response from the rideshare server 130 with regard to comparison of biometric scans would be necessary, i.e. steps 808 and 810 in the flow diagram would be optional.

Figure 9:
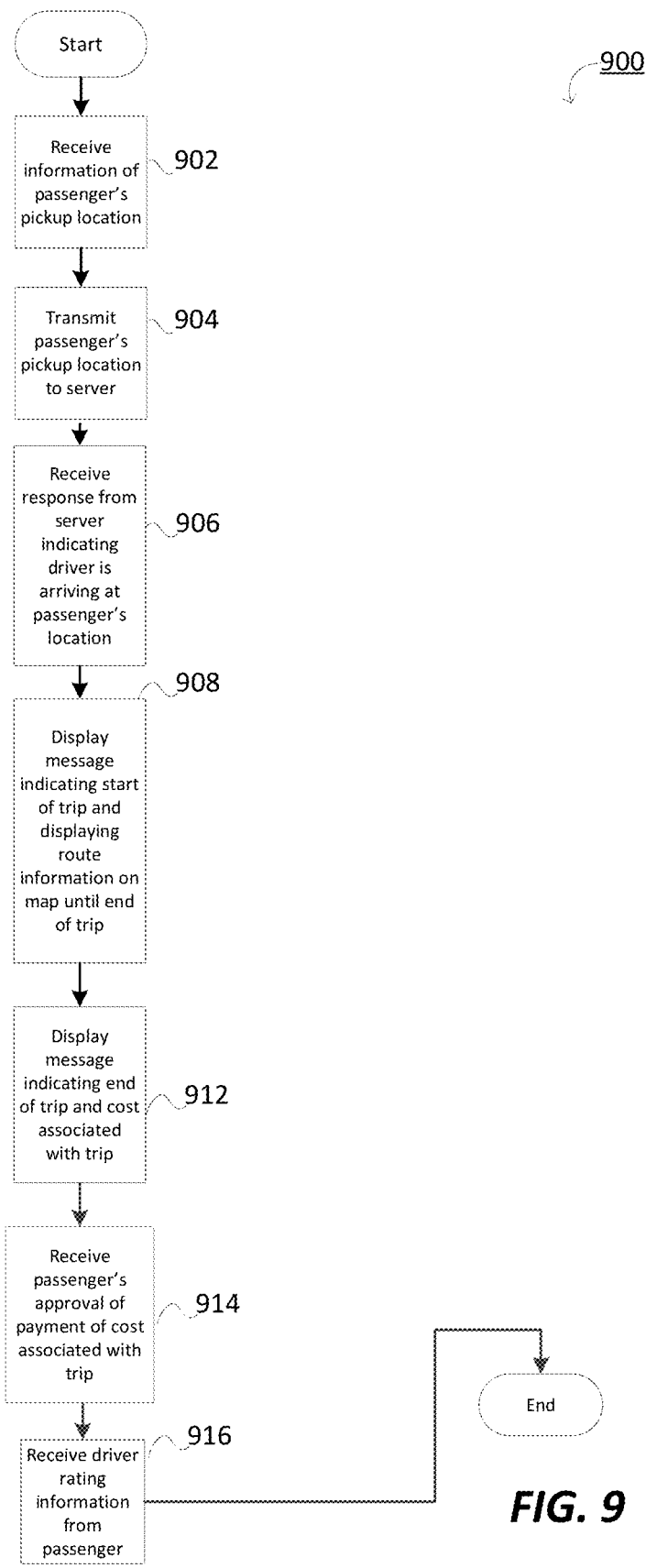
FIG. 9 illustrates a flow diagram showing method steps by a mobile app running on a passenger's mobile device in connection with a passenger availing a rideshare trip, according to an embodiment of the present invention.

FIG. 9 illustrates a flow diagram showing method steps of a process 900 by a mobile app running on a passenger's mobile device in connection with a passenger availing a rideshare trip, according to an embodiment of the present invention. Starting at step 902, the process receives a passenger's pickup location (e.g., in the form of an address) from a passenger via the mobile app running on the passenger's mobile device. The process transmits the pickup location to the rideshare server at step 904. The rideshare server 130 responds back with information about the rideshare driver and the driver's vehicle, which is received by the process at step 906. For example, the ride share server 130 can provide a name and contact information (e.g., phone number, email, etc.) of the driver, a photograph of the driver, a make, year, model and photograph of the vehicle that the driver is driving. In some instances, the rideshare server 130 provides an estimate of the rideshare trip to the passenger. After the driver drives to the passenger's pickup location, in some embodiments, the process displays (at step 908) a message indicating a start of a rideshare trip, assuming the passenger gets in the driver's vehicle. In some embodiments, the process displays route information relating to the rideshare trip on a screen of the passenger's mobile device in real-time until the passenger arrives at the passenger's intended destination. The route information, for example, can be obtained from a geocoding server 116. Upon arriving at the passenger's intended destination, the process displays (at step 912) end of the rideshare trip and a cost associated with the rideshare trip. In some optional embodiments, the process enables a passenger to enter (at step 914) driver rating information (e.g., on a five star scale, or some other scale) via the mobile app running on the passenger's mobile device. The process terminates thereafter. In some embodiments, a driver can view, for example by accessing a driver portal or via a mobile application, the rating information (e.g., comments/feedback etc.) provided by passengers along with an associated date and time.

Figure 10:
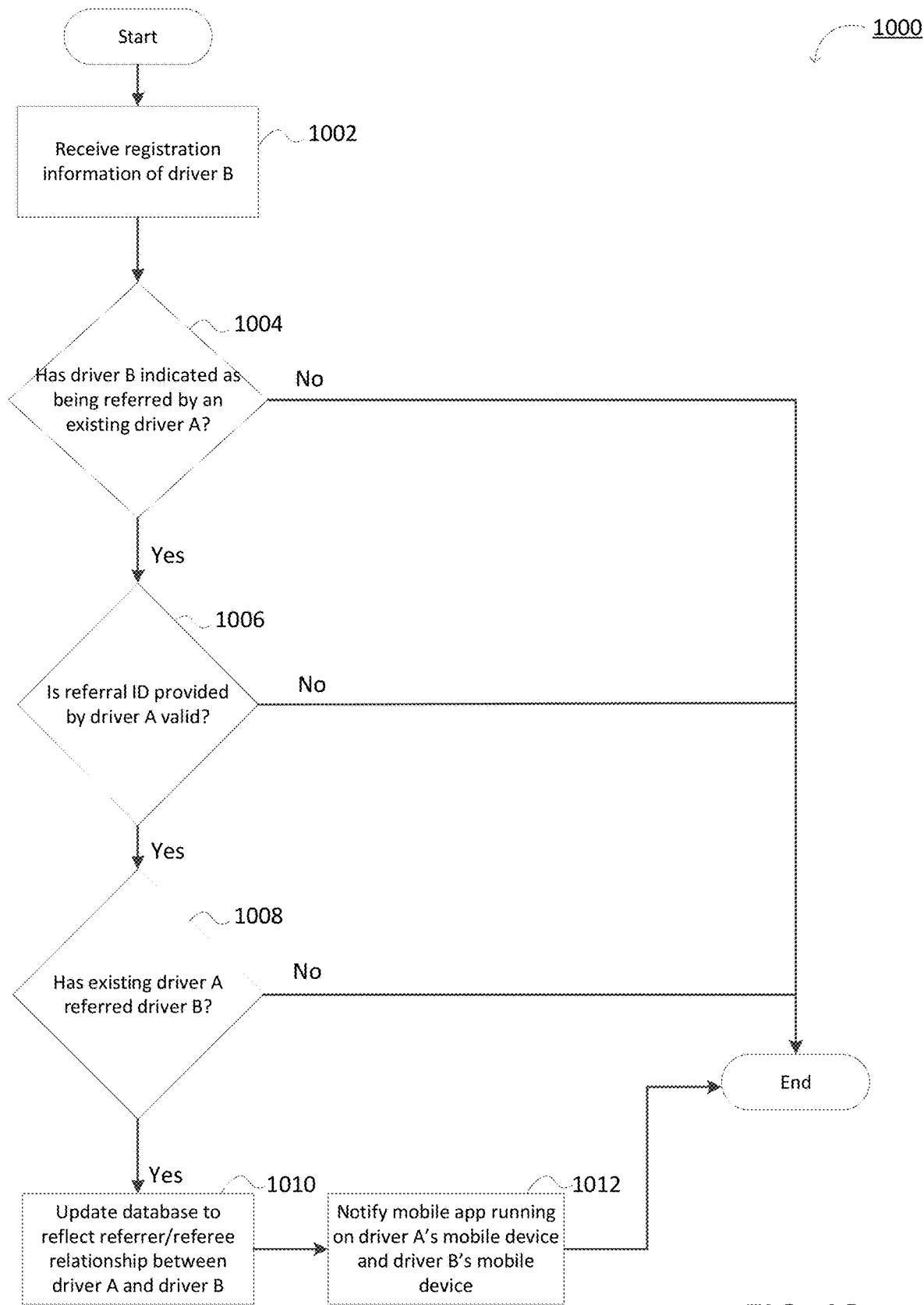
FIG. 10 illustrates a flow diagram showing method steps by a rideshare server identifying referral chains according to an embodiment of the present invention.

FIG. 10 illustrates a flow diagram showing method steps of a process 1000 by a rideshare server identifying referral chains, according to an embodiment of the present invention. In this flow diagram, it is assumed that an existing driver (referrer or "Driver A") suggests a new driver (referee or "Driver B") to sign up with the rideshare service. For example, a referrer can share a referral ID provided by the rideshare server 130 with the referee. Starting at step 1002, the process receives registration information of driver B during an initial registration process, for example, after launching the driver's mobile app for the first time on driver B's mobile device. The registration information can include, for example, the driver's biometric scan, the driver's personal information, the driver's vehicle information, etc. In some aspects, a registered driver notifies the rideshare server 130 that he or she has provided a referral ID to driver B. Accordingly, when driver B registers with the rideshare service, driver B may be required to provide the referral ID provided by the registered driver. Such a methodology can prevent fraud when driver learns B about the rideshare service from a registered driver, but does not provide the referral ID provided by the registered driver, in an attempt not to share his or her earnings with the registered driver.

The process determines (at step 1004) if driver B has indicated, as part of the registration process, as being referred by another driver A. If the process determines that the driver B has indicated as not being referred by a driver, then the process terminates. If, however, the process determines that the driver B has indicated as being referred by an existing driver, then the process receives a referral ID provided by driver B. Thus, the process determines (at step 1006) if the referral ID provided by driver B is a valid referral ID. For example, the process determines if the referral ID has been used multiple times, or is being used by unrecognized individuals associated with the referral ID. If the process determines that the referral ID is not valid, then the process terminates. In some embodiments, the process displays a message indicating that the referral ID provided by driver B is not valid.

If, however, the referral ID is determined to be valid, then the process also determines (at step 1008) whether an existing driver A has notified the rideshare server 130 of sharing the referral ID with driver B. If the process determines that no existing driver A has notified the rideshare server 130 of sharing the referral ID with a driver B, then the process terminates, suspecting fraud by registering driver B. If the process determines, however, that an existing driver A has notified the rideshare server 130 of sharing the referral ID with a driver B, then the process updates (at step 1010) a database to reflect the referrer/referee relationship between driver A and driver B. In some embodiments, the process communicates the referrer/referee relationship between driver A and driver B to either, or both, driver A and driver B's mobile app running on their respective mobile devices. The process terminates thereafter. In some embodiments, a network marketer can provide referral of proposed new drivers to the rideshare server 130 via the network marketer portal. A network marketer is an individual or an entity that is not a registered driver of the rideshare service and provides referral of proposed new drivers to the rideshare server 130. A network marketer can earn percentages of a driver's earnings if such a driver was referred by a network marketer and signed up with the rideshare service. In some embodiments, the process of identifying referral chains involving network marketers is similar to that in which an existing driver (referrer or "Driver A") suggests a new driver (referee or "Driver B") as discussed in FIG. 10, with Driver A being replaced by a network marketer as suitable.

Figure 11:
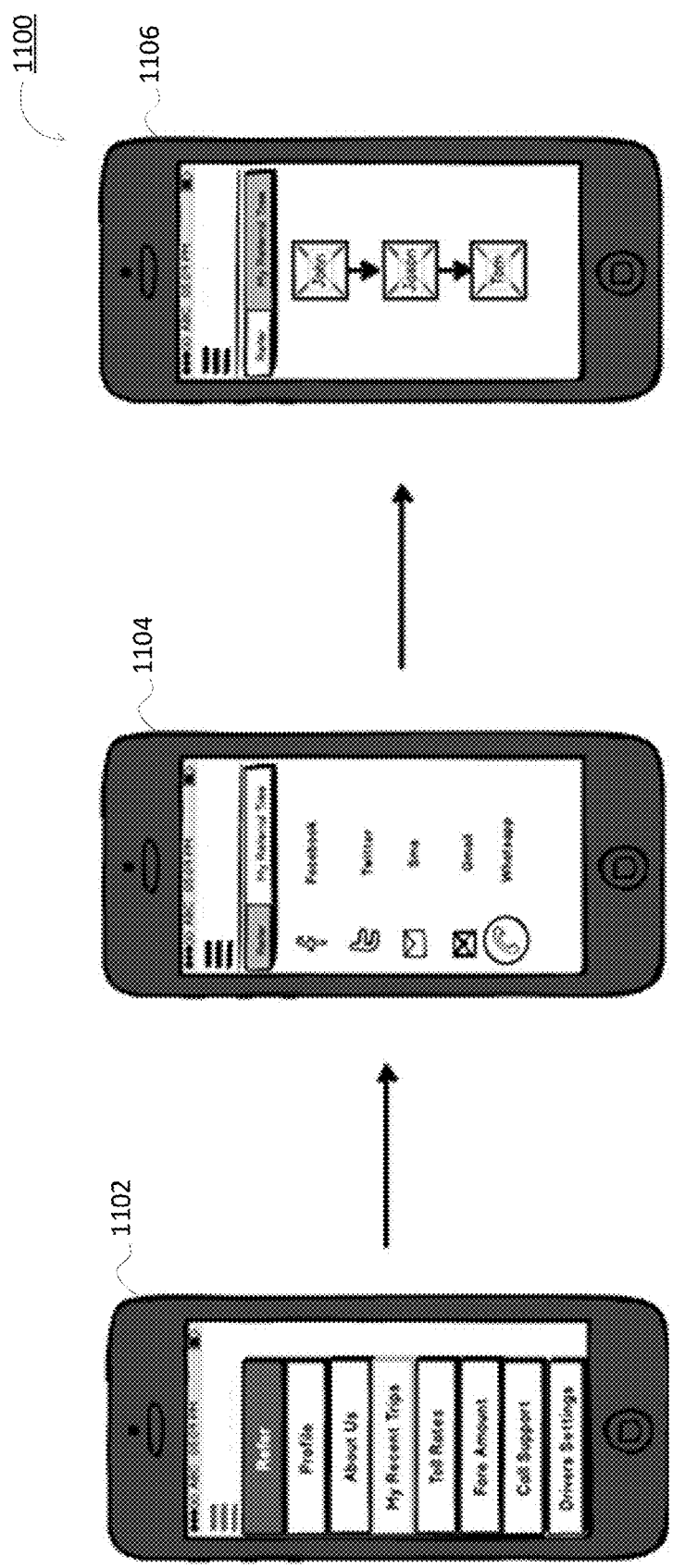
FIG. 11 illustrates several example mobile device interface screens of a driver's mobile app according to an embodiment of the present invention.

FIG. 11 illustrates several mobile device interface screens 1100 of a driver's mobile app, according to an embodiment of the present invention. For example screen 1102 shows options in connection with at least the following inventive features: referring a proposed new driver (a "Refer" button), viewing a profile of the driver associated with the mobile app (a "Profile" button), viewing information about the rideshare service (an "About Us" button), viewing recent rideshare trips offered by the driver associated with the mobile app (a "My Recent Trips" button), viewing toll rates at a geographical location (a "Toll Rates" button), viewing a cost of a last rideshare trip offered by the driver associated with the mobile app (a "Fare Amount" button), facilitating a call with a driver support phone number (a "Call Support" button), and viewing a driver's personal settings on the mobile app (a "Driver's Settings" button). Screen 1104 shows clickable options for launching mobile apps of third parties such as social media network and social texting apps from the driver's mobile app. Screen 1106 displays an exemplary driver referral chain involving three drivers. For example, screen 1106 shows a driver John referred a driver Jason who referred a driver Tom. Thus, driver John that is associated with the mobile app accumulates earnings from drivers Jason and Tom.

Figure 12:
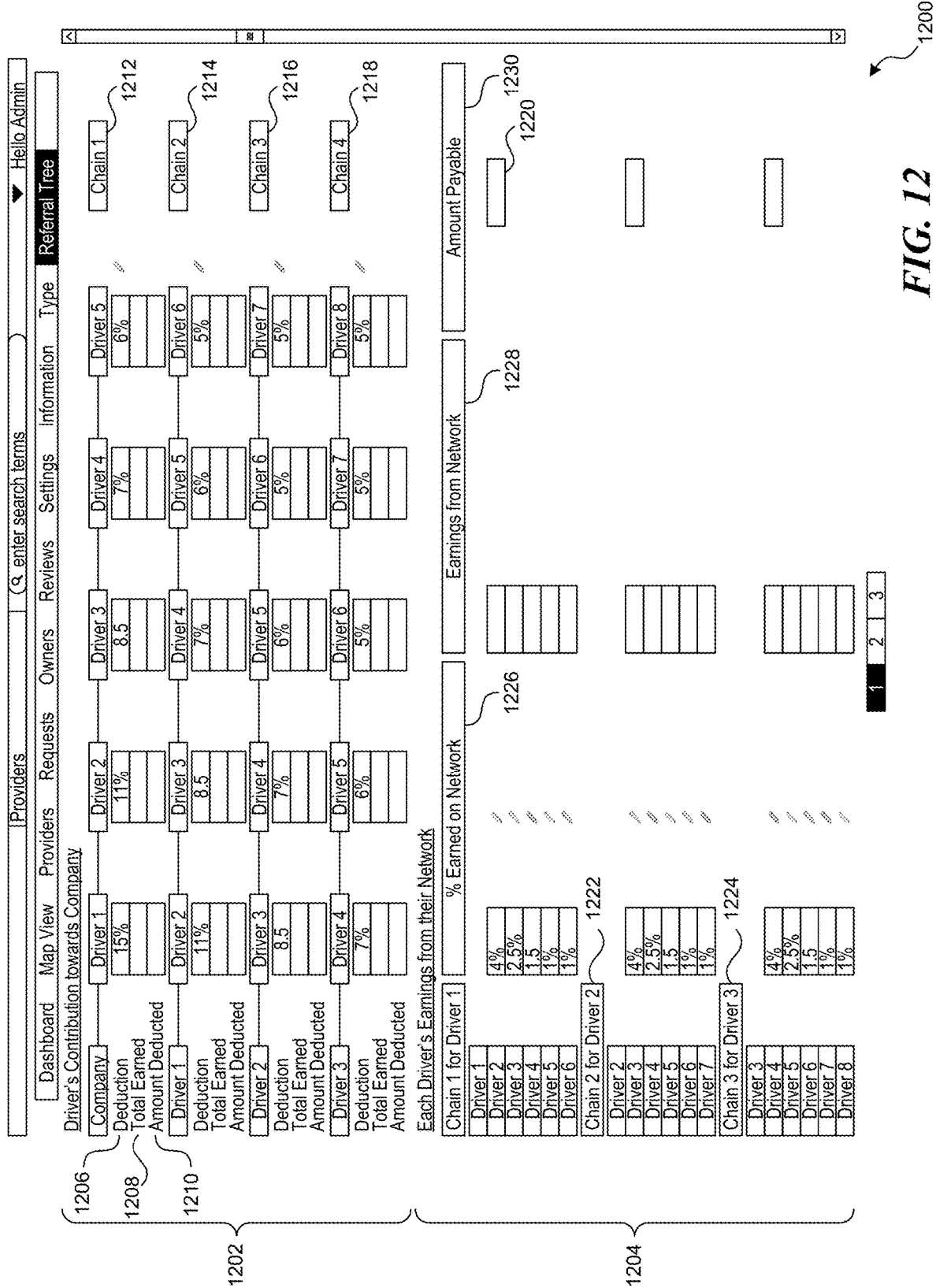
Figure 14:
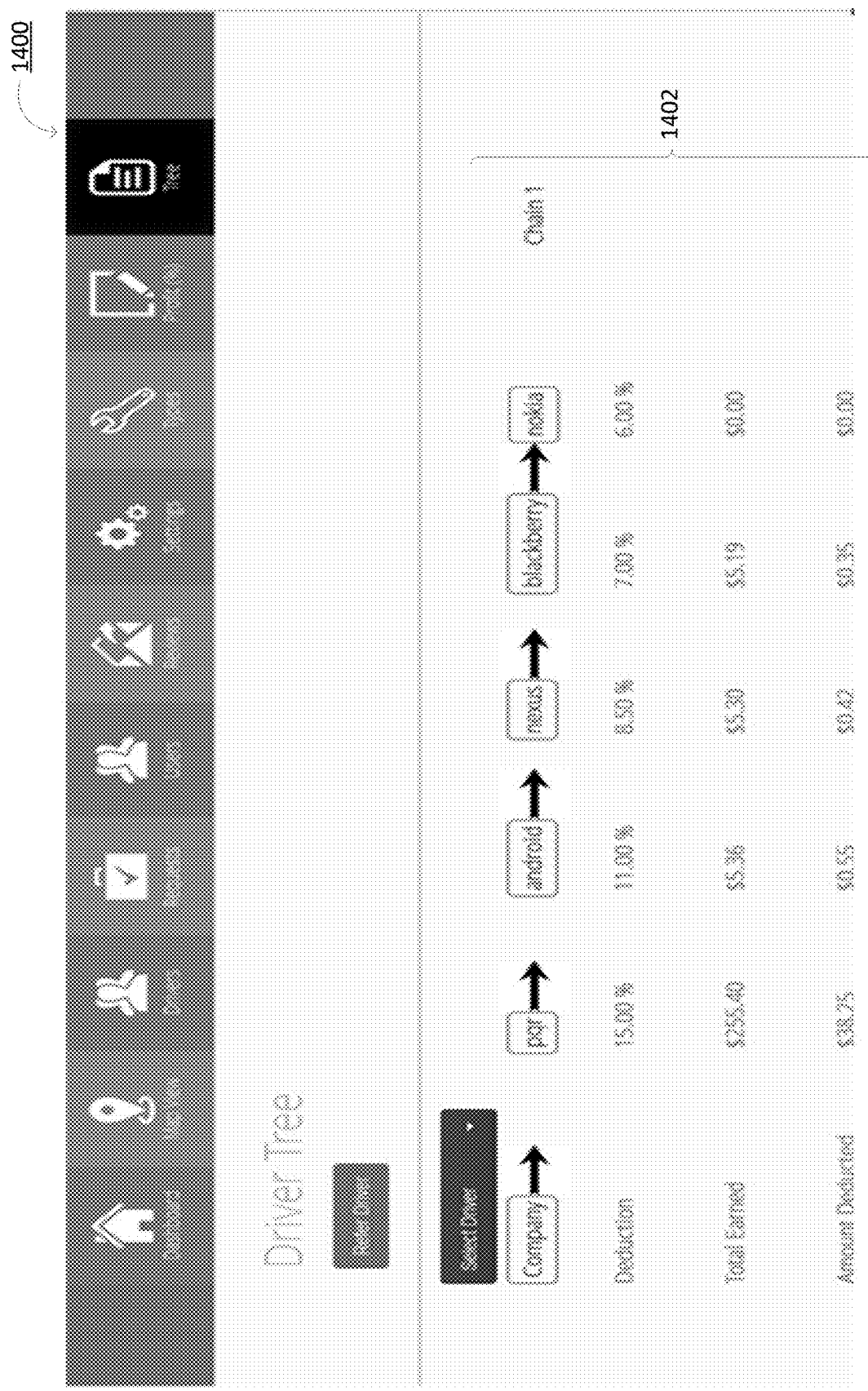

FIGS. 12-14 illustrate interfaces showing earnings accumulated via a driver's referral chain, according to an embodiment of the present invention. According to embodiments of the present disclosure, the interfaces in FIGS. 12-14 can be viewed by a system administrator associated with the rideshare service. Region 1202 of FIG. 12 displays four exemplary referral chains 1212 (chain 1), 1214 (chain 2), 1216 (chain 3), and 1214 (chain 4), each chain showing percentage contributions of a driver to the rideshare service. Embodiments of the present disclosure facilitate a hierarchical earning structure such that the rideshare service retains a percentage from each driver in a referral chain. For example, in a referral chain in which driver 1 refers driver 2, driver 2 refers driver 3, driver 3 refers driver 4, and so on, the rideshare service retains 15% of driver 1's earnings, 11% of driver 2's earnings, 8.5% of driver 3's earnings, 7% of driver 4's earnings, and so on. These percentages are displayed as percentage deductions in line 1206 of FIG. 12. Lines 1208 and 1210 of FIG. 12 respectively display a total amount earned by each driver in a referral chain from offering rideshare services, and an amount retained by the rideshare service from each driver's earnings.

Region 1204 of FIG. 12 shows each driver's earnings from their referral chain network. Column 1226 shows percentage earnings by a respective driver from other drivers in their referral chain network, e.g., driver 1 earns 4% of driver 2's earnings, 2.5% of driver 3's earnings, 1.5% of driver 4's earnings, and so on. Column 1228 displays a respective monetary amount corresponding to each percentage in column 1228. Column 1230 displays a total amount earned by a driver by accumulating his or her earnings from the driver's referral chain. Referral chains 1222 and 1224 are exemplary referral chains showing earning by drivers 2 and 3 from their respective referral chain networks. FIG. 13 displays a detailed view of an exemplary referral chain showing percentages retained by the rideshare service and percentage earnings associated with each driver in the chain. FIG. 13 demonstrates that the percentages retained by the rideshare service can be similar as those discussed for chain 1 in FIG. 12. For example, region 1302 in FIG. 13 shows a referral chain in which driver pqr refers driver android, driver android refers driver nexus, driver nexus refers driver blackberry, and so on, the ridesharing service retains 15% of driver pqr's earnings, 11 of driver android's earnings, 8.5% of driver nexus' earnings, 7% of driver blackberry's earnings, and so on. In some embodiments, there can be theoretically infinite levels of distribution of earnings. Percentages associated with each level can be varied by a system administrator of the rideshare server 130. Region 1304 in FIG. 13 shows percentage earnings by a respective driver from other drivers in their referral chain network (e.g., similar to column 1226 in FIG. 12), a respective monetary amount corresponding to each percentage (e.g., similar to column 1228 in FIG. 12), and a total amount earned by a driver by accumulating his or her earnings from the driver's referral chain (e.g., similar to column 1228 in FIG. 13). FIG. 14 presents a magnified view of percentage earnings (region 1402) retained by the rideshare service from a respective driver and other drivers in the subject driver's referral chain network, similar to region 1302 shown in FIG. 13.

Figure 15:
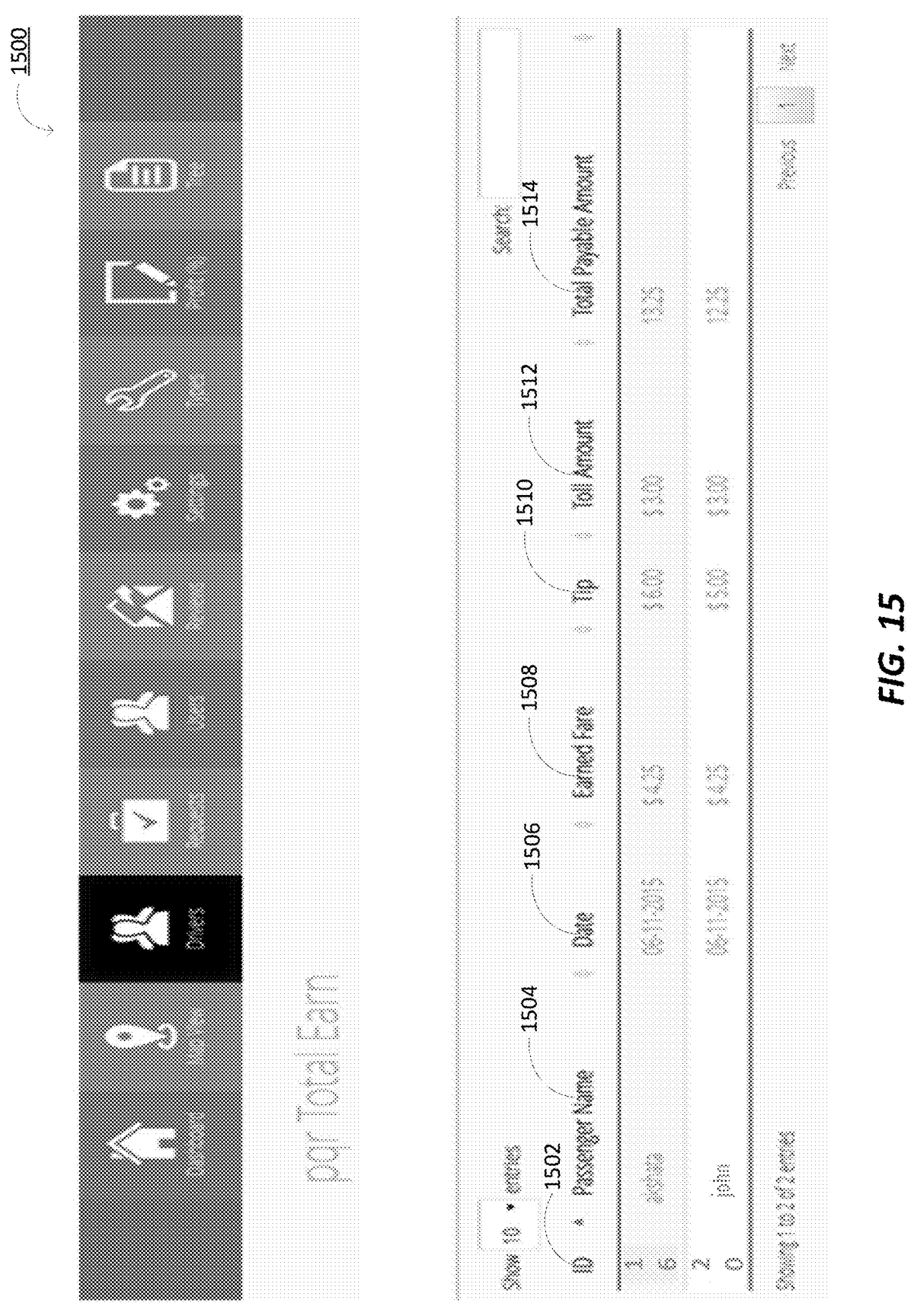

FIG. 15 illustrates an interface 1500 displaying a driver's earnings history, according to an embodiment of the present invention. As shown in FIG. 15, the interface can display columns 1502 ("Passenger ID"), 1504 ("Passenger Name"), 1506 ("Date of Rideshare Trip"), 1508 ("Earned Fare"), 1510 ("Tip"), 1512 ("Toll Amount"), and 1514 ("Total Payable Amount"). For example, FIG. 15 shows earnings for a driver pqr from passengers Akshata (identified by passenger id 16) and John (identified by passenger id 20), the dates on which the rideshare trips were offered, a cost of the rideshare trip, a tip paid by each passenger to driver pqr, and a toll amount payable to the driver by the rideshare service in connection with the trip. FIG. 15 also displays a total payable amount to driver pqr based on the sum of the cost of the trip, the tip paid by a passenger and the toll amount. According to embodiments of the present disclosure, the interface in FIG. 15 can be viewed by driver pqr or a system administrator associated with the rideshare service. In some embodiments, the system provides options to enter a start date and an end date over which a driver's earnings history is displayed.

Figure 16:
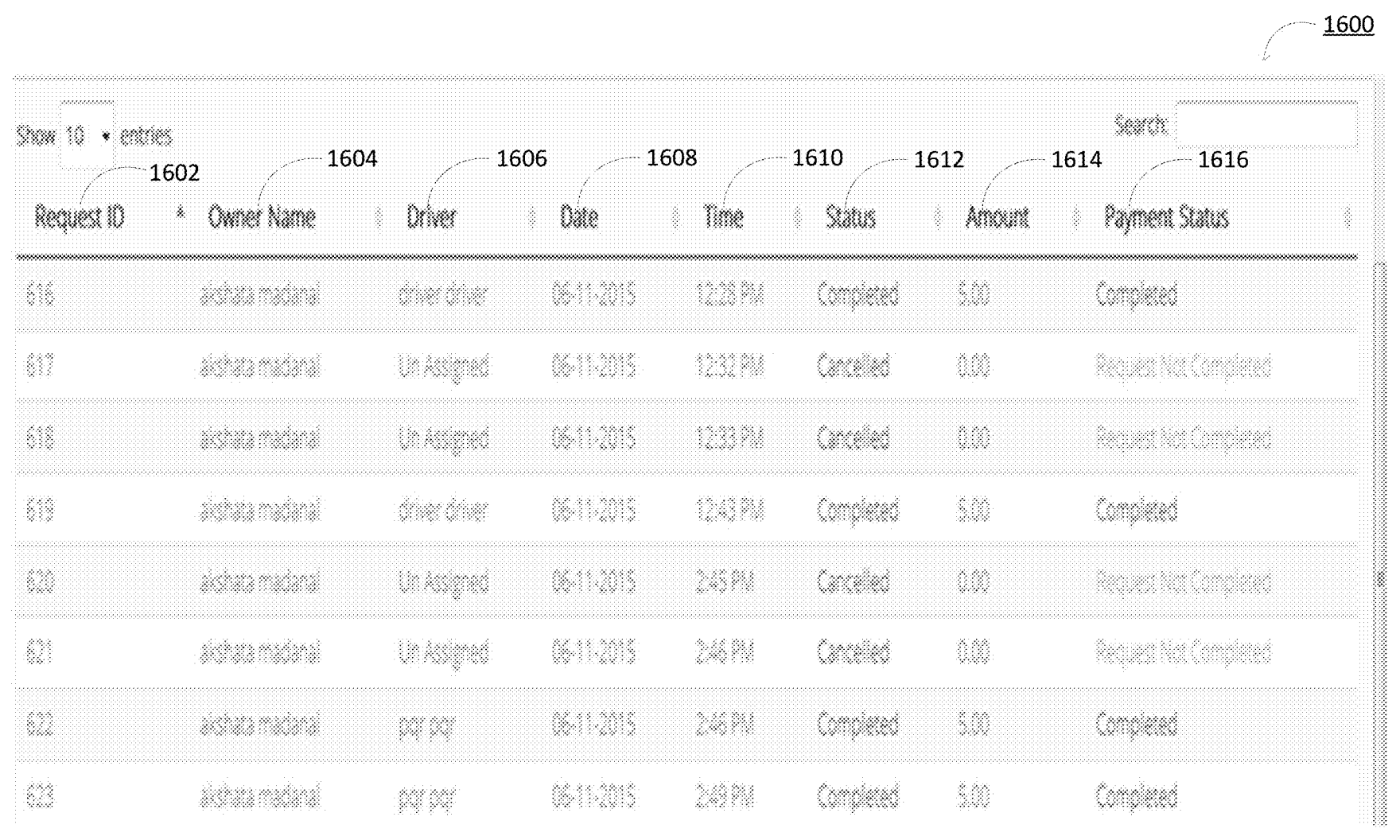

FIG. 16 illustrates an interface 1600 showing a passenger's trip history, as viewed by a system administrator associated with the rideshare service, according to an embodiment of the present invention. As shown in FIG. 16, the interface can display columns 1602 ("Request ID"), 1604 ("Owner Name"), 1606 ("Driver"), 1608 ("Date"), 1610 ("Time"), 1612 ("Status"), 1614 ("Amount"), and 1618 ("Payment Status"). A request ID column is a unique identifier corresponding to an instance of a rideshare request from a passenger. A Status column provides a status of the rideshare trip. A Payment Status column provides information pertaining to receiving a payment for a rideshare trip from a passenger's financial institution. There could be multiple payment statuses associated with a trip, e.g., completed or request not completed depending on whether the payment has been received from a passenger's financial institution or not. In some embodiments, the system provides options to enter a start date and an end date over which a passenger's trip history is displayed.

Figure 17:
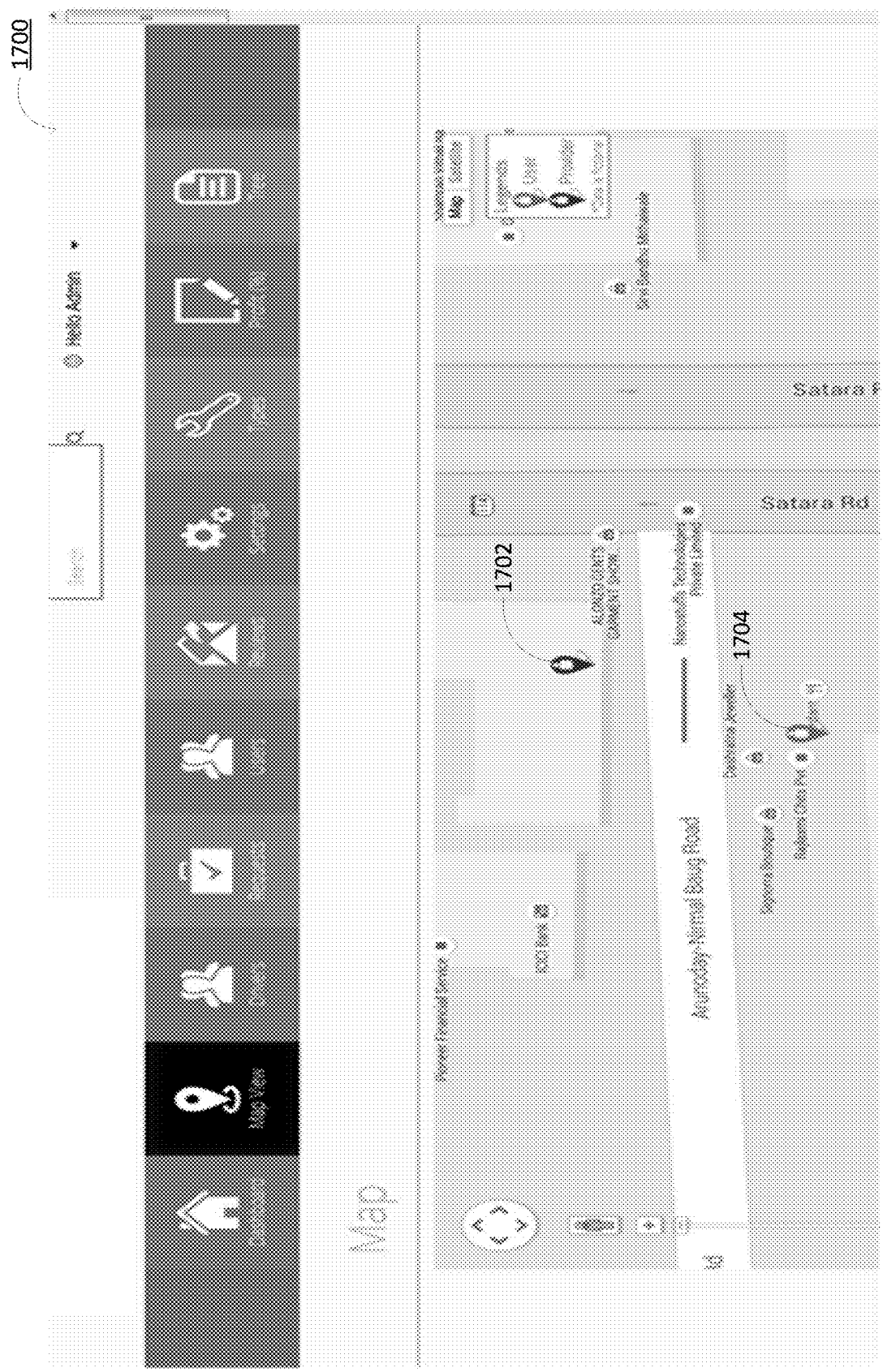
FIG. 17 illustrates an example interface showing a passenger's pickup location with respect to a rideshare driver's location displayed on a map according to an embodiment of the present invention.

FIG. 17 illustrates an interface 1700 showing a passenger's pickup location with respect to a rideshare driver's location displayed on a map, according to an embodiment of the present invention. For example, a rideshare driver's (provider's) location 1702 is relatively near the passenger's (user's) location 1704. According to embodiments of the present disclosure, the interface 1700 can be viewed on the mobile app running on the driver's mobile device and/or the mobile app running on the passenger's mobile device. In some embodiments, a system administrator can view/track the driver's movement and/or the passenger's movement via an interface similar to interface 1700. Thus, according to inventive aspects disclosed herein, the system can obtain in real-time, a number and location of drivers at a geographical location who are offering to provide rideshare trips to passengers. Such aspects are beneficial in selecting, for instance, a driver that is located closest to a passenger's location such that the driver can arrive at the passenger's pickup location in a short time.

FIGS. 18-19 illustrate interfaces 1800, 1900 linked to a driver database, according to an embodiment of the present invention. As shown in FIG. 18, the interface can display columns 1802 ("Driver ID"), 1804 ("Name"), 1806 ("Email"), 1808 ("Phone"), 1810 ("Photo"), 1812 ("Bio"), 1814 ("Total Requests"), 1816 ("Status"), and 1818 ("Actions"). Photo column provides a link to a driver's photo saved in the database. Total Requests column indicates a total number of rideshare requests made to a driver by passengers. Status column indicates whether the driver was approved based on passing a background check and driving history. Action column provides a drop-down menu of selectable actions such as decline, set target, edit details, and view details. The decline option removes the driver from the database. The system administrator can view and edit driver-related information saved in the database, by selecting the edit details or view details options. The set target option can be used by a system administrator to set a target amount that a driver is required to earn between a start date and an end date. In some embodiments, a driver can view the days remaining to reach a target amount. The interface generated upon selecting the set target option is shown in greater detail in region 1902 of FIG. 19. In some embodiments, the set target option is applicable only to drivers who are part of a referral chain. That is, this functionality, in some embodiments, is disabled for drivers that are not part of a referral chain.

Figure 20:
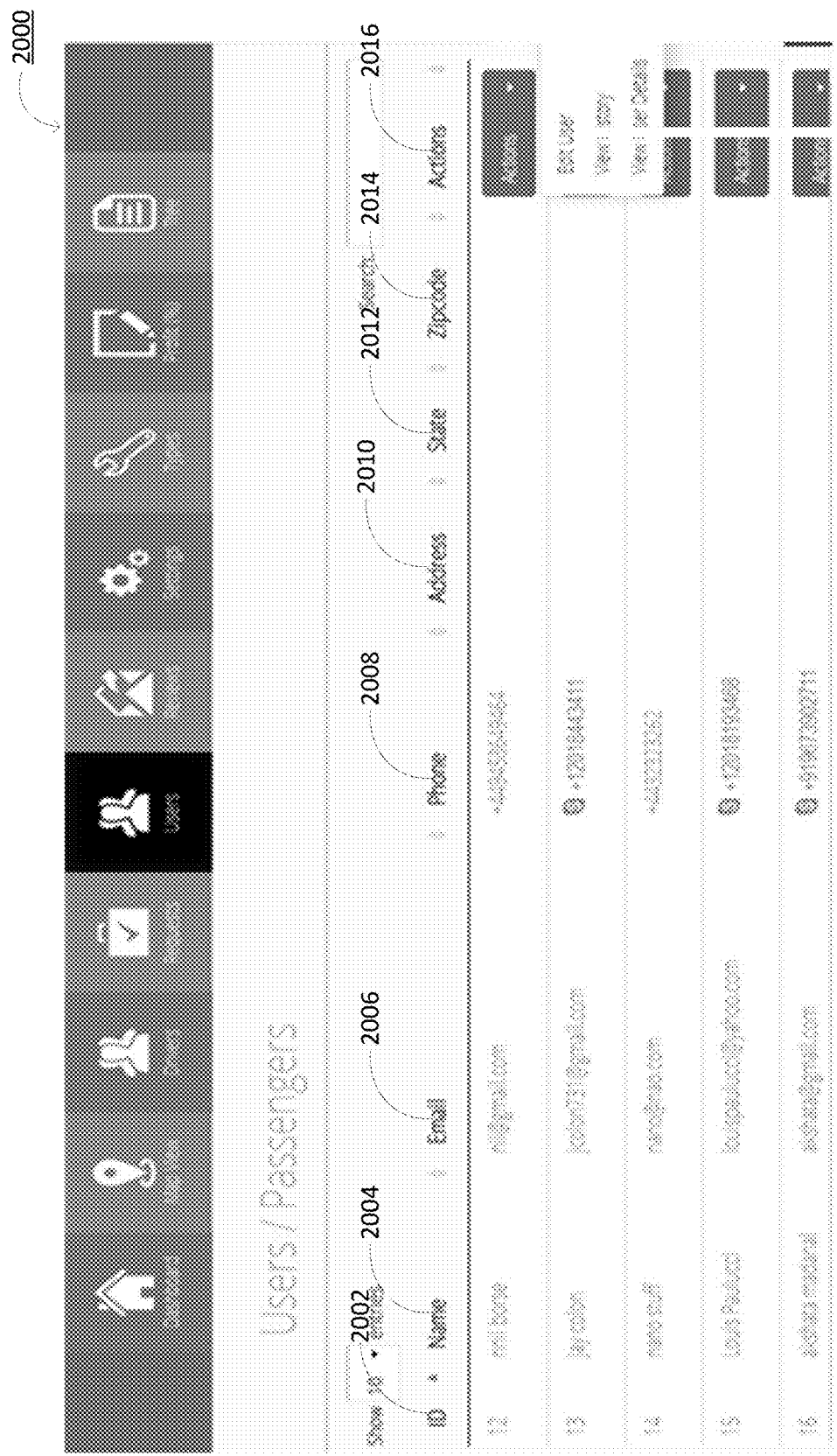
FIG. 20 illustrates an example interface linked to a passenger database according to an embodiment of the present invention.

FIG. 20 illustrates a passenger database, according to an embodiment of the present invention. As shown in FIG. 20, the interface can display columns 2002 ("ID"), 2004 ("Name"), 2006 ("Email"), 2008 ("Phone"), 2010 ("Address"), 2012 ("State"), 2014 ("Zipcode"), and 2016 ("Actions"). Actions column provides a drop-down menu of selectable actions such as edit passenger details, view history of a passenger's rideshare trips, and view additional passenger-related information saved in database.

Figure 21:
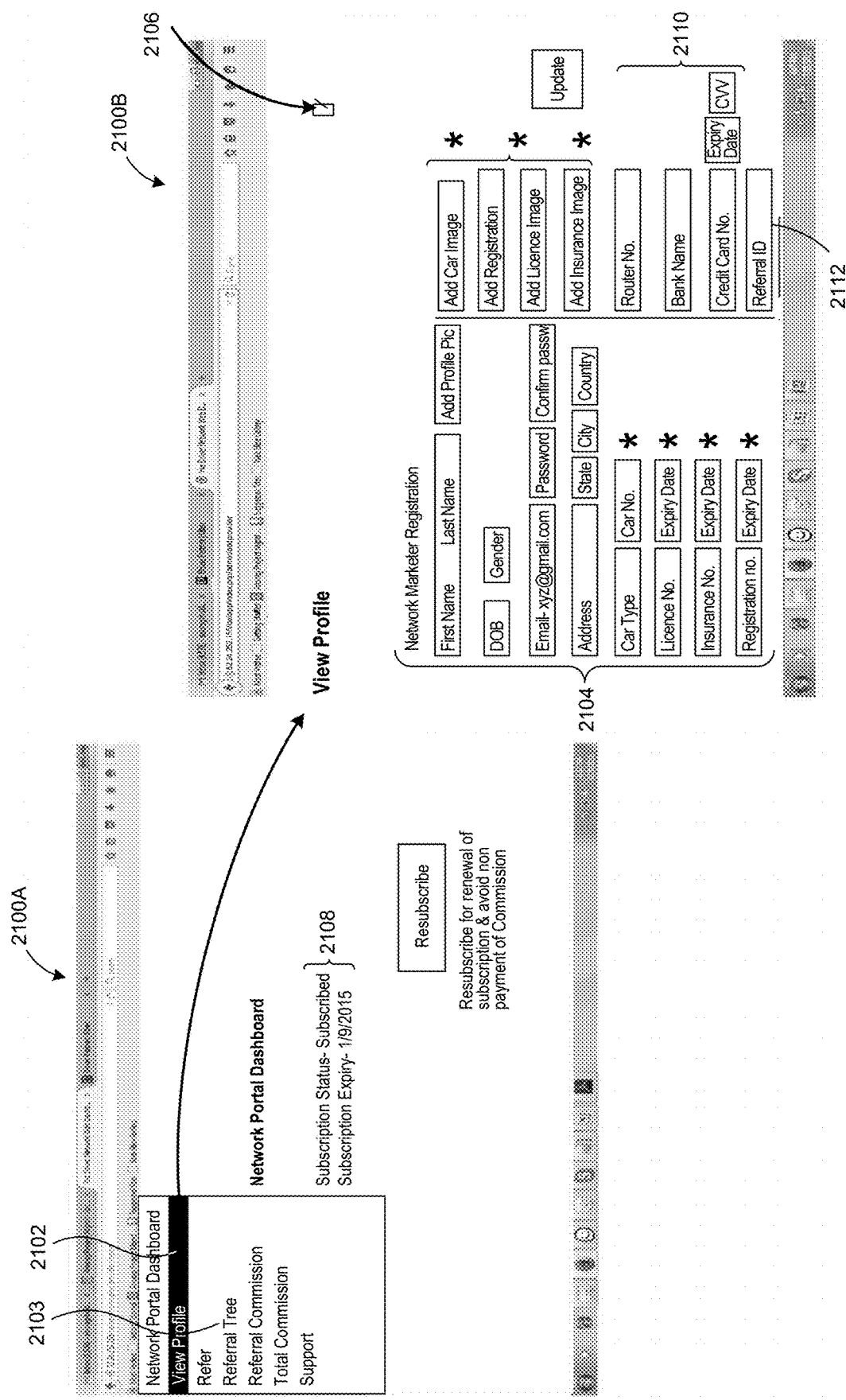
FIGS. 21-22 illustrate example interfaces for a network marketer to access the rideshare server via a network marketer portal, according to an embodiment of the present invention.
Figure 22:
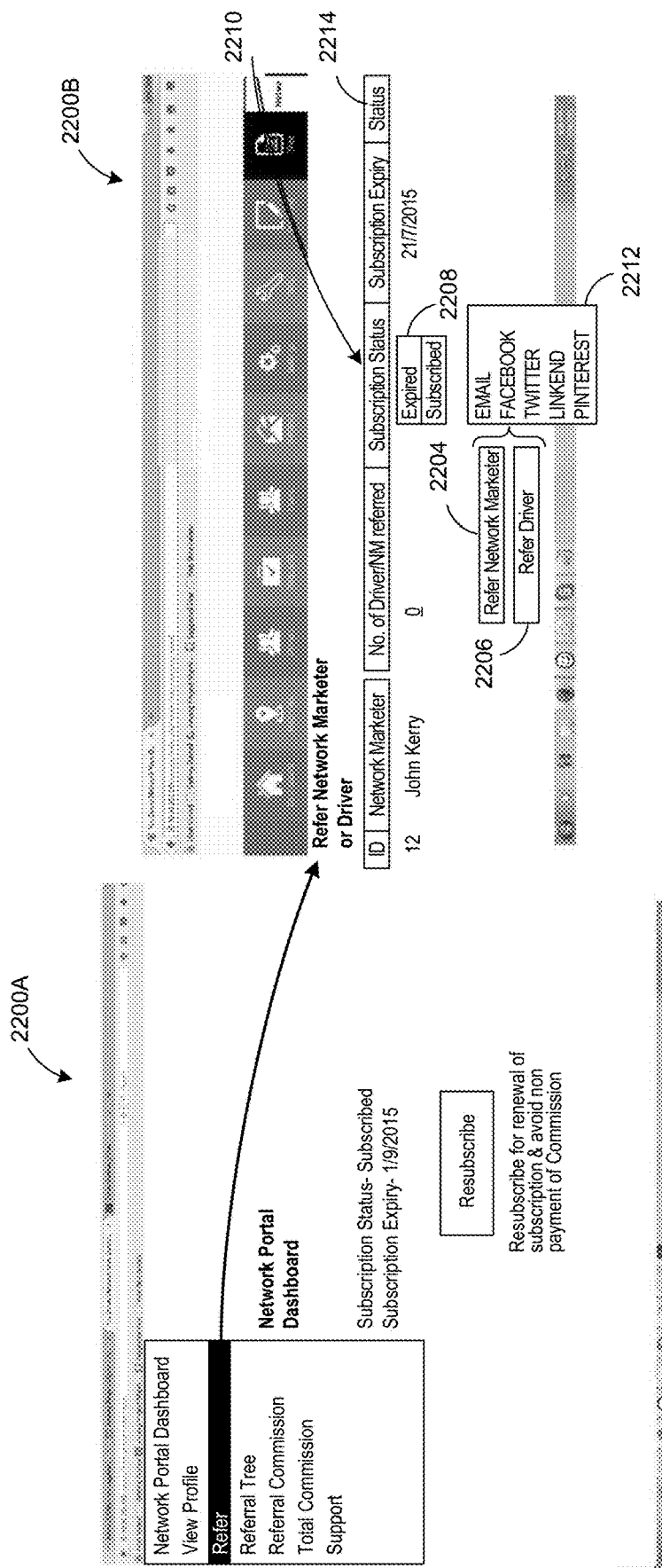

FIGS. 21-22 illustrate interfaces 2100A, 2100B, and 2200A, 2200B respectively showing an embodiment of the network marketer portal presented by the rideshare server to network marketers. In some embodiments, a network marketer can provide referral of proposed new drivers to the rideshare server 130 via the network marketer portal. A network marketer is an individual or an entity that is not a registered driver of the rideshare service and provides referral of proposed new drivers to the rideshare server 130. A network marketer can earn percentages of a driver's earnings if such a driver was referred by a network marketer and signed up with the rideshare service. When a network marketer clicks on a ("View Profile") button 2102 on the interface 2100 A, the interface 2100B is displayed. Region 2108 of interface 2100A displays a subscription status of a network marketer and a subscription expiration date of a network marketer. In some embodiments, a network marketer has to keep an active subscription with the rideshare service to be able to refer new drivers and/or earn percentages of a referred driver's earnings. In some embodiments, a driver that was referred by a network marketer can refer new drivers to the rideshare service. In such scenarios, a network marketer earns percentages of all drivers that are included in the subject driver's referral chain, in addition to the earnings of the subject driver. A "Referral Tree" button 2103 displays a network marketer's referral tree. Interface 2100B displays a "View Profile" interface to a network marketer. For example, region 2104 displays registration information that is typically provided by a network marketer when he or she signs up with the rideshare service. Region 2104 includes example fields such as a first name, a last name, a date of birth, a gender, an email address, a password along with a confirm password, an address including a state, a city and a country. Region 2104 also includes an option for a network marketer to add a profile picture. In some embodiments, region 2104 includes driver-related fields such as a vehicle number, a type of vehicle, a license number of the driver, a registration number of the vehicle, an insurance policy number of the vehicle, a license expiration date of the driver, a registration expiration date of the driver, an insurance expiration date, etc. However, such driver-related fields can be deactivated (shown with a "*" in FIG. 21), and accordingly, a network marketer would not be able to input data relating to such fields. Additionally, interface 2200B shows a region 2110 for providing a network marketer's bank-related information to the rideshare server 130. For example, region 2110 includes a router/routing number of a bank, a bank name, a credit card number along with its expiry date and its CVV number. In some embodiments, region 2110 includes a referral ID button 2112. In some embodiments, when a network marketer clicks on button 2112, the rideshare server 130 generates dynamically a referral ID that can be shared with a proposed new driver or sent via email to the proposed new driver. In some embodiments, the rideshare server 130 retrieves a pre-generated referral ID and presents it to the network marketer, in response to the network marketer clicking on button 2112.

FIG. 22 illustrate interfaces 2200A and 2200B showing a portal accessible by a network marketer for referring a driver to the rideshare service. Interface 2200A is similar to interface 2100A. For example, interface 2200 displays a network marketer having an ID 12, and a name John Kerry having a subscription expiry date of 21 Jul. 2015, and a number of drivers (e.g., zero) referred by the network marketer. A "Subscription Status" button 2210 when clicked on this interface reveals whether the network marketer's subscription is expired or still subscribed, indicated in box 2208. Interface 2200B also includes a Status button 2214, which when clicked, reveals the names of the drivers that were referred by the network marketer. In some embodiments, existing drivers cannot be referred by a network marketer to the rideshare service. In some embodiments, an existing network marketer can refer another driver by clicking on a Refer Driver button 2206. In some embodiments, an existing network marketer can refer another network marketer by clicking on a Refer Network Marketer button 2204. New driver referrals and new network marketer referrals can be made by social media networks or via email, e.g., as shown in box 2212. For example, if a new driver is referred, then a downloadable link to a driver's mobile application is shared, inviting the new driver to sign up with the rideshare service. If a new network marketer is being referred, then a link to the network marketer portal (for signup) is shared.

The terminology used in the description presented below is intended to be interpreted in its broadest reasonable manner, even though it is being used in conjunction with a detailed description of certain specific examples of the technology. Certain terms may even be emphasized below, however, any terminology intended to be interpreted in any restricted manner will be overtly and specifically defined as such in this Detailed Description section.

In this disclosure, numerous specific details have been set forth in order to provide a thorough understanding of embodiments of the present disclosure. It will be apparent, however, to one skilled in the art that embodiments of the present disclosure may be practiced without some of these specific details.

Embodiments of the present disclosure include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware. As will be understood, the steps of the processes shown in FIGS. 7-10 are not necessarily completed in the order shown, and various steps may operate concurrently and continuously. It will be understood that the drawings and discussions herein refer to two items of digital content, i.e. a first item and a second item. But such drawings and discussions are for exemplary purposes only. In alternate embodiments, multiple (e.g., more than two) items of digital content can be used as a part of a validation process.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Moreover, embodiments of the present disclosure may also be downloaded as a computer program product or data to be used by a computer program product, wherein the program, data, and/or instructions may be transferred from a remote computer to a requesting computer by way of data signals embodied in a carrier wave or other propagation medium via a communication link (e.g., a modem or network connection).

The invention claimed is:

1. A method for facilitating vehicle rideshares to passengers by drivers via drivers' mobile devices, the method comprising:

receiving registration information of a driver obtained by a mobile application running on the driver's mobile device during an initial registration process and communicated over a wireless network from the driver's mobile device to a server computer,
  wherein the registration information includes the driver's personal information and the driver's vehicle information,
  wherein a first biometric scan of the driver is stored at the driver's mobile device, and
  wherein a rideshare service for the mobile application goes offline after completing the initial registration process;
receiving, by the server computer, an indication generated by the driver's mobile device that the driver elects to provide a rideshare trip requested by a passenger's mobile device;
in response to the indication that the driver elects to provide the rideshare trip requested by the passenger's mobile device, transmitting a request for the driver's mobile device to provide a second biometric scan of the driver;
receiving, by the server computer, the first biometric scan stored at the driver's mobile device and the second biometric scan,
  wherein the second biometric scan is captured by the driver's mobile device after the first biometric scan was captured by the driver's mobile device;
upon receiving the second biometric scan of the driver, comparing the first biometric scan and the second biometric scan for a match; and
in response to detecting the match, remotely causing the rideshare service of the mobile application to go online and transmitting pickup information for the mobile application on the driver's mobile device,
  wherein the pickup information includes a name of the passenger and a pickup location of the passenger.

2. The method of claim 1, wherein the first biometric scan and the second biometric scan are each received via a biometric sensor coupled to, or inside the driver's mobile device.

3. The method of claim 1, wherein the registration information includes a name of the driver and at least one of license information of the driver, a social security number of the driver, a picture of the driver, and a picture of the vehicle.

4. The method of claim 1, further comprising:
receiving referral information for the driver,
  wherein the referral information includes a referral code provided to the driver by an existing driver associated with the server computer;
verifying the referral information; and
in response to a successful verification of the referral information, transmitting information for displaying a link connection between a user profile of the driver and a user profile of the existing driver on a user interface of a mobile device.

5. The method of claim 1, further comprising:
transmitting an intended destination of the passenger; and
transmitting, in real-time, navigation directions to the intended destination along a route from the pickup location to the intended destination.

6. The method of claim 5, wherein a source of the navigation directions is a geocoding server.

7. The method of claim 1, wherein the first biometric scan is stored for later retrieval.

8. A method for facilitating rideshares to passengers by drivers via a ridesharing server, the method comprising:
receiving, at the ridesharing server, registration information via a mobile application running on a mobile device of a driver during an initial registration process with the ridesharing server for providing rideshare trips,
  wherein the registration information includes the driver's personal information, the driver's vehicle information, and a first biometric scan of the driver, and
  wherein a rideshare service for the mobile application goes offline after completing the initial registration process;
determining that the driver selects to offer a rideshare trip based on input to the driver's mobile device;
in response to determining that the driver selects to offer the rideshare trip, receiving a second biometric scan of the driver from the driver's mobile device;
comparing the first biometric scan and the second biometric scan for a match; and
in response to detecting the match, remotely causing the rideshare service of the mobile application to go online and providing pickup information to the mobile application running on the mobile device of the driver,
  wherein the pickup information includes a name of a passenger and a pickup location of the passenger.

9. The method of claim 8, wherein the registration information includes a name of the driver, license information of the driver, a social security number of the driver, a picture of the driver, and a picture of the driver's vehicle.

10. The method of claim 8, further comprising:
receiving referral information from the mobile application running on the mobile device of the driver, wherein the referral information includes a referral code provided to the driver's mobile device by an existing driver associated with the ridesharing server; and
in response to receiving information corresponding to successful verification of the referral information, creating a link connection in a database storing a user profile of the driver and a user profile of the existing driver.

11. The method of claim 8, further comprising:
receiving referral information from the mobile application running on the mobile device of the driver, wherein the referral information includes a referral code provided to the driver by an existing driver associated with the ridesharing server;
in response to receiving information corresponding to successful verification of the referral information, creating a hierarchical link in a database storing a user profile of the driver and a user profile of the existing driver; and
transmitting to the mobile application running on the mobile device of the driver, information pertaining to signup of the driver with the ridesharing service.

12. The method of claim 11, further comprising:
transmitting to a mobile application running on a mobile device of the existing driver, information pertaining to signup of the driver with the ridesharing service.

13. The method of claim 11, wherein the hierarchical link includes one or more levels, each level corresponding to a referral link between a first driver that has signed up with the ridesharing server and a second driver that refers the first driver.

14. The method of claim 11, wherein the hierarchical link includes one or more levels, each level corresponding to a referral link between a first driver that has signed up with the ridesharing server and a second driver that refers the first driver, further comprising:

providing a percentage of earnings of the driver to the existing driver according to a level in the hierarchical link connection.

15. The method of claim 8, wherein the first biometric scan is stored for later retrieval.

16. A non-transitory machine-readable storage medium comprising instructions that, when executed by a processing device, cause the processing device to:
receive an indication that a driver elects to provide a rideshare trip requested by a passenger,
wherein the request for the rideshare is based on input by the passenger on the passenger's mobile device,
wherein the indication is based on input by the driver to a mobile application running on the driver's mobile device and communicated over a wireless network from the driver's mobile device to a server computer, and
wherein a rideshare service of the mobile application remains offline despite the driver electing to provide the rideshare trip;
retrieve pre-stored registration information for the driver that includes a first biometric scan of the driver;
transmit, to the driver's mobile device, a request to provide a second biometric scan of the driver in response to receiving the indication to provide the rideshare trip,
wherein the second biometric scan is captured by the driver's mobile device after the first biometric scan was captured by the driver's mobile device;
compare the first biometric scan and the second biometric scan upon receiving the second biometric scan to determine if there is a match;
determine the match between the second biometric scan and the first biometric scan;
remotely cause the rideshare service of the mobile application to go online and transmit pickup information in response to a determination of the match,
wherein the pickup information includes a name of the passenger and a pickup location of the passenger.

* * * * *